(12) United States Patent
Shambley et al.

(10) Patent No.: US 11,504,879 B2
(45) Date of Patent: Nov. 22, 2022

(54) POWDER SPREADING APPARATUS AND SYSTEM

(71) Applicant: Beehive Industries, LLC, Englewood, CO (US)

(72) Inventors: William B. Shambley, Tyngsboro, MA (US); Michael V. Pozderac, Mt. Vernon, OH (US); William R. Buckley, Jr., Butler, OH (US)

(73) Assignee: Beehive Industries, LLC, Englewood, CO (US)

( * ) Notice: Subject to any disclaimer, the term of this patent is extended or adjusted under 35 U.S.C. 154(b) by 0 days.

(21) Appl. No.: 17/234,255

(22) Filed: Apr. 19, 2021

(65) Prior Publication Data
US 2021/0323190 A1    Oct. 21, 2021

Related U.S. Application Data

(60) Provisional application No. 63/011,343, filed on Apr. 17, 2020.

(51) Int. Cl.
*B33Y 30/00* (2015.01)
*B29C 64/329* (2017.01)
(Continued)

(52) U.S. Cl.
CPC ............ *B28B 1/001* (2013.01); *B29C 64/165* (2017.08); *B29C 64/205* (2017.08);
(Continued)

(58) Field of Classification Search
CPC ... B29C 64/329; B29C 64/343; B29C 64/205; B29C 64/218; B29C 64/153;
(Continued)

(56) References Cited

U.S. PATENT DOCUMENTS 2,539,084 A * 1/1951 Keeley ..................... B44F 1/04
                                                                118/301
2,640,629 A    6/1953 Thomson et al.
(Continued)

FOREIGN PATENT DOCUMENTS

CN         107695354 A     2/2018
WO          88/02677 A2    4/1988
(Continued)

OTHER PUBLICATIONS

International Search Report and Written Opinion from corresponding International Application No. PCT/US2021/027965, dated Jul. 15, 2021, 15 pages.
(Continued)

*Primary Examiner* — Mary Lynn F Theisen
(74) *Attorney, Agent, or Firm* — Andrew C. Hess

(57) ABSTRACT

A powder spreading apparatus includes a hopper having a first end, a second end opposite from the first end, a front wall, a rear wall opposite from the front wall, and a floor. The front wall, the rear wall, the first end, the second end, and the floor define an interior. An impeller is disposed within the interior of the hopper. The impeller includes a plurality of circumferentially spaced flutes and is configured to rotate about an impeller axis that extends from the first end of the hopper to the second end of the hopper to deposit powder onto a print area. A spreader rod is coupled to the hopper and extends along a spreader rod axis parallel to the impeller axis. The spreader rod is configured to rotate about the spreader rod axis to smooth the powder as it is deposited onto the print area.

3 Claims, 20 Drawing Sheets

(51) Int. Cl.

| | |
|---|---|
| *B29C 64/343* | (2017.01) |
| *B29C 64/205* | (2017.01) |
| *B29C 64/218* | (2017.01) |
| *B28B 1/00* | (2006.01) |
| *B33Y 10/00* | (2015.01) |
| *B29C 64/165* | (2017.01) |
| *B65G 47/44* | (2006.01) |
| *B65G 47/78* | (2006.01) |

(52) U.S. Cl.
CPC .......... *B29C 64/218* (2017.08); *B29C 64/329* (2017.08); *B29C 64/343* (2017.08); *B33Y 10/00* (2014.12); *B33Y 30/00* (2014.12); *B65G 47/44* (2013.01); *B65G 47/78* (2013.01)

(58) Field of Classification Search
CPC ........ B29C 64/165; B22F 10/14; B22F 10/28; B22F 12/52; B22F 12/57; B22F 12/63; B05C 19/04; B05C 19/06
See application file for complete search history.

(56) References Cited

U.S. PATENT DOCUMENTS

| | | |
|---|---|---|
| 2,692,142 A | 10/1954 | Hunter |
| 2,857,938 A | 10/1958 | Wahl |
| 2,962,785 A | 12/1960 | Young |
| 3,405,206 A | 10/1968 | Abell et al. |
| 3,616,969 A | 11/1971 | Koizumi |
| 3,616,972 A | 11/1971 | Christy |
| 3,815,527 A | 6/1974 | Dobbins |
| 3,913,503 A | 10/1975 | Becker |
| 3,964,386 A | 6/1976 | Dini |
| 4,239,715 A | 12/1980 | Pratt |
| 4,247,508 A | 1/1981 | Housholder |
| 4,279,949 A | 7/1981 | Esser |
| 4,352,723 A | 10/1982 | Morgan |
| 4,369,025 A | 1/1983 | von der Weid |
| 4,575,330 A | 3/1986 | Hull |
| 4,579,252 A | 4/1986 | Wilson et al. |
| 4,630,755 A | 12/1986 | Campbell |
| 4,639,765 A | 1/1987 | D'Hont |
| 4,665,492 A | 5/1987 | Masters |
| 4,669,634 A | 6/1987 | Leroux |
| 4,752,352 A | 6/1988 | Feygin |
| 4,863,538 A | 9/1989 | Deckard |
| 4,889,433 A | 12/1989 | Pratt |
| 4,938,816 A | 7/1990 | Beaman et al. |
| 4,944,817 A | 7/1990 | Bourell et al. |
| 5,017,753 A | 5/1991 | Deckard |
| 5,053,090 A | 10/1991 | Beaman et al. |
| 5,059,266 A | 10/1991 | Yamane et al. |
| 5,076,869 A | 12/1991 | Bourell et al. |
| 5,120,476 A | 6/1992 | Scholz |
| 5,127,037 A | 6/1992 | Bynum |
| 5,132,143 A | 7/1992 | Deckard |
| 5,134,569 A | 7/1992 | Masters |
| 5,136,515 A | 8/1992 | Helinski |
| 5,140,937 A | 8/1992 | Yamane et al. |
| 5,147,587 A | 9/1992 | Marcus et al. |
| 5,149,548 A | 9/1992 | Yamane et al. |
| 5,155,324 A | 10/1992 | Deckard et al. |
| 5,156,697 A | 10/1992 | Bourell et al. |
| 5,182,170 A | 1/1993 | Marcus et al. |
| 5,204,055 A | 4/1993 | Sachs et al. |
| 5,216,616 A | 6/1993 | Masters |
| 5,221,539 A | 6/1993 | Pallerberg et al. |
| 5,248,249 A | 9/1993 | Yamamoto et al. |
| 5,248,456 A | 9/1993 | Evans, Jr. et al. |
| 5,252,264 A | 10/1993 | Forderhase et al. |
| 5,284,695 A | 2/1994 | Barlow et al. |
| 5,296,062 A | 3/1994 | Bourell et al. |
| 5,316,580 A | 5/1994 | Deckard |
| 5,340,656 A | 8/1994 | Sachs et al. |
| 5,342,919 A | 8/1994 | Dickens, Jr. et al. |
| 5,352,405 A | 10/1994 | Beaman et al. |
| 5,354,414 A | 10/1994 | Feygin |
| 5,382,308 A | 1/1995 | Bourell et al. |
| 5,387,380 A | 2/1995 | Cima et al. |
| 5,431,967 A | 7/1995 | Manthiram et al. |
| 5,433,520 A | 7/1995 | Adams et al. |
| 5,482,659 A | 1/1996 | Sauerhoefer |
| 5,490,882 A | 2/1996 | Sachs et al. |
| 5,490,962 A | 2/1996 | Cima et al. |
| 5,503,785 A | 4/1996 | Crump et al. |
| 5,506,607 A | 4/1996 | Sanders, Jr. et al. |
| 5,518,680 A | 5/1996 | Cima et al. |
| 5,555,176 A | 9/1996 | Menhennett et al. |
| 5,573,055 A | 11/1996 | Melling et al. |
| 5,573,721 A | 11/1996 | Gillette |
| 5,597,589 A | 1/1997 | Deckard |
| 5,601,868 A | 2/1997 | Gerhardt |
| 5,616,294 A | 4/1997 | Deckard |
| 5,639,070 A | 6/1997 | Deckard |
| 5,639,402 A | 6/1997 | Barlow et al. |
| 5,647,931 A | 7/1997 | Retallick et al. |
| 5,658,412 A | 8/1997 | Retallick et al. |
| 5,660,621 A | 8/1997 | Bredt |
| 5,665,401 A | 9/1997 | Serbin et al. |
| 5,730,925 A | 3/1998 | Mattes et al. |
| 5,740,051 A | 4/1998 | Sanders, Jr. et al. |
| 5,753,274 A | 5/1998 | Wilkening et al. |
| 5,775,402 A | 7/1998 | Sachs et al. |
| 5,807,437 A | 9/1998 | Sachs et al. |
| 5,814,161 A | 9/1998 | Sachs et al. |
| 5,851,465 A | 12/1998 | Bredt |
| 5,869,170 A | 2/1999 | Cima et al. |
| 5,902,441 A | 5/1999 | Bredt et al. |
| 5,902,537 A | 5/1999 | Almquist et al. |
| 5,934,343 A | 8/1999 | Gaylo et al. |
| 5,940,674 A | 8/1999 | Sachs et al. |
| 5,943,235 A | 8/1999 | Earl et al. |
| 5,965,170 A | 10/1999 | Matsuoka et al. |
| 5,989,476 A | 11/1999 | Lockard et al. |
| 6,007,318 A | 12/1999 | Russell et al. |
| 6,030,199 A | 2/2000 | Tseng |
| 6,036,777 A | 3/2000 | Sachs |
| 6,042,774 A | 3/2000 | Wilkening et al. |
| 6,048,188 A | 4/2000 | Hull et al. |
| 6,070,973 A | 6/2000 | Sachs et al. |
| 6,094,994 A | 8/2000 | Satake et al. |
| 6,109,332 A | 8/2000 | Sachs et al. |
| 6,112,804 A | 9/2000 | Sachs et al. |
| 6,116,517 A | 9/2000 | Heinzl et al. |
| 6,133,353 A | 10/2000 | Bui et al. |
| 6,139,574 A | 10/2000 | Vacanti et al. |
| 6,146,567 A | 11/2000 | Sachs et al. |
| 6,147,138 A | 11/2000 | Hochsmann et al. |
| 6,155,331 A | 12/2000 | Langer et al. |
| 6,164,850 A | 12/2000 | Speakman |
| 6,165,406 A | 12/2000 | Jang et al. |
| 6,176,874 B1 | 1/2001 | Vacanti et al. |
| 6,193,922 B1 | 2/2001 | Ederer |
| 6,197,575 B1 | 3/2001 | Griffith et al. |
| 6,217,816 B1 | 4/2001 | Tang |
| 6,258,170 B1 | 7/2001 | Somekh et al. |
| 6,259,962 B1 | 7/2001 | Gothait |
| 6,270,335 B2 | 8/2001 | Leyden et al. |
| 6,280,771 B1 | 8/2001 | Monkhouse et al. |
| 6,305,769 B1 | 10/2001 | Thayer et al. |
| 6,316,060 B1 | 11/2001 | Elvidge et al. |
| 6,322,728 B1 | 11/2001 | Brodkin et al. |
| 6,354,361 B1 | 3/2002 | Sachs et al. |
| 6,355,196 B1 | 3/2002 | Kotnis et al. |
| 6,375,874 B1 | 4/2002 | Russell et al. |
| 6,395,811 B1 | 5/2002 | Nguyen et al. |
| 6,397,722 B1 | 6/2002 | Eddington |
| 6,401,001 B1 | 6/2002 | Jang et al. |
| 6,403,002 B1 | 6/2002 | van der Geest |
| 6,416,850 B1 | 7/2002 | Bredt et al. |
| 6,423,255 B1 | 7/2002 | Hoechsmann et al. |
| 6,436,334 B1 | 8/2002 | Hattori et al. |
| 6,460,979 B1 | 10/2002 | Heinzl et al. |
| 6,467,525 B2 | 10/2002 | Herreid et al. |

(56) References Cited

U.S. PATENT DOCUMENTS

| | | |
|---|---|---|
| 6,476,122 B1 | 11/2002 | Leyden |
| 6,500,378 B1 | 12/2002 | Smith |
| 6,554,600 B1 | 4/2003 | Hofmann et al. |
| 6,610,429 B2 | 8/2003 | Bredt et al. |
| 6,658,314 B1 | 12/2003 | Gothait |
| 6,713,125 B1 | 3/2004 | Sherwood et al. |
| 6,733,267 B2 | 5/2004 | Chapman et al. |
| 6,733,528 B2 | 5/2004 | Abe et al. |
| 6,764,636 B1 | 7/2004 | Allanic et al. |
| 6,830,643 B1 | 12/2004 | Hayes |
| 6,838,035 B1 | 1/2005 | Ederer et al. |
| 7,004,222 B2 | 2/2006 | Ederer et al. |
| 7,137,431 B2 | 11/2006 | Ederer et al. |
| 7,204,684 B2 | 4/2007 | Ederer et al. |
| 7,381,360 B2 | 6/2008 | Oriakhi et al. |
| 7,748,971 B2 | 7/2010 | Hochsmann et al. |
| 7,767,130 B2 | 8/2010 | Elsner et al. |
| 7,799,253 B2 | 9/2010 | Hochsmann et al. |
| 7,807,077 B2 | 10/2010 | Hochsmann et al. |
| 7,979,152 B2 | 7/2011 | Davidson |
| 8,185,229 B2 | 5/2012 | Davidson |
| 8,349,233 B2 | 1/2013 | Ederer et al. |
| 8,475,946 B1 | 7/2013 | Dion et al. |
| 8,506,870 B2 | 8/2013 | Hochsmann et al. |
| 8,715,832 B2 | 5/2014 | Ederer et al. |
| 8,727,672 B2 | 5/2014 | Ederer et al. |
| 8,741,194 B1 | 6/2014 | Ederer et al. |
| 8,911,226 B2 | 12/2014 | Gunther et al. |
| 8,951,033 B2 | 2/2015 | Hochsmann et al. |
| 8,956,140 B2 | 2/2015 | Hartmann |
| 8,970,867 B2 | 3/2015 | Baldwin et al. |
| 9,149,987 B2 | 10/2015 | Hartmann |
| 9,174,391 B2 | 11/2015 | Hartmann et al. |
| 9,174,392 B2 | 11/2015 | Hartmann |
| 9,242,413 B2 | 1/2016 | Hartmann et al. |
| 9,272,264 B2 | 3/2016 | Coupland |
| 9,278,338 B2 | 3/2016 | Coupland |
| 9,321,934 B2 | 4/2016 | Mogele et al. |
| 9,333,709 B2 | 5/2016 | Hartmann |
| 9,403,324 B2 | 8/2016 | Ederer et al. |
| 9,433,969 B2 | 9/2016 | Pridoehl et al. |
| 9,446,448 B2 | 9/2016 | McCoy et al. |
| 9,463,488 B2 | 10/2016 | Ederer et al. |
| 9,469,074 B2 | 10/2016 | Ederer et al. |
| 9,486,962 B1 | 11/2016 | Dugan et al. |
| 9,505,176 B2 | 11/2016 | Ederer |
| 9,508,667 B2 | 11/2016 | Prack |
| 9,616,620 B2 | 4/2017 | Hoechsmann et al. |
| 9,643,360 B2 | 5/2017 | Kashani-Shirazi |
| 9,649,812 B2 | 5/2017 | Hartmann et al. |
| 9,656,423 B2 | 5/2017 | Hartmann |
| 9,676,143 B2 | 6/2017 | Kashani-Shirazi |
| 9,744,726 B2 | 8/2017 | Levine et al. |
| 9,763,788 B2 | 9/2017 | Biris |
| 9,770,867 B2 | 9/2017 | Mogele et al. |
| 9,782,934 B2 | 10/2017 | Willis et al. |
| 9,815,243 B2 | 11/2017 | Hartmann |
| 9,833,955 B2 | 12/2017 | Muller et al. |
| 9,839,907 B2 | 12/2017 | Coupland |
| 9,856,390 B2 | 1/2018 | Bredt et al. |
| 9,878,494 B2 | 1/2018 | Hartmann et al. |
| 9,914,169 B2 | 3/2018 | Ederer et al. |
| 9,925,721 B2 | 3/2018 | Grasegger et al. |
| 9,931,762 B2 | 4/2018 | Hartmann |
| 9,943,981 B2 | 4/2018 | Gunther |
| 9,956,727 B2 | 5/2018 | Steele |
| 9,962,885 B2 | 5/2018 | Gunther et al. |
| 9,981,426 B2 | 5/2018 | Gunther et al. |
| 9,987,707 B2 | 6/2018 | Dong et al. |
| 9,993,975 B2 | 6/2018 | Hartmann et al. |
| 10,040,216 B2 | 8/2018 | Bai et al. |
| 10,052,682 B2 | 8/2018 | Ederer et al. |
| 10,052,822 B1 | 8/2018 | Sait |
| 10,059,058 B2 | 8/2018 | Hartmann et al. |
| 10,059,062 B2 | 8/2018 | Ederer et al. |
| 10,061,284 B2 | 8/2018 | Brunermer et al. |
| 10,068,863 B2 | 9/2018 | Prack |
| 10,073,424 B2 | 9/2018 | Lin et al. |
| 10,093,065 B2 | 10/2018 | Ederer et al. |
| 10,099,426 B2 | 10/2018 | Ederer et al. |
| 10,144,207 B2 | 12/2018 | Brunermer et al. |
| 10,178,868 B2 | 1/2019 | Contractor et al. |
| 10,179,365 B2 | 1/2019 | Ederer et al. |
| 10,213,831 B2 | 2/2019 | Ederer et al. |
| 10,213,938 B2 | 2/2019 | Ederer et al. |
| 10,220,567 B2 | 3/2019 | Gunther et al. |
| 10,220,568 B2 | 3/2019 | Ederer et al. |
| 10,226,919 B2 | 3/2019 | Ederer |
| 10,286,571 B2 | 5/2019 | Hochsmann et al. |
| 10,343,301 B2 | 7/2019 | Gunther et al. |
| 10,363,730 B2 | 7/2019 | Klein et al. |
| 10,394,050 B2 | 8/2019 | Rasschaert et al. |
| 10,449,718 B1 | 10/2019 | Stroud et al. |
| 2001/0050031 A1 | 12/2001 | Bredt et al. |
| 2002/0016387 A1 | 2/2002 | Shen |
| 2002/0026982 A1 | 3/2002 | Bredt et al. |
| 2002/0111707 A1 | 8/2002 | Li et al. |
| 2002/0167100 A1 | 11/2002 | Moszner et al. |
| 2003/0083771 A1 | 5/2003 | Schmidt |
| 2004/0012112 A1 | 1/2004 | Davidson et al. |
| 2004/0025905 A1 | 2/2004 | Ederer et al. |
| 2004/0026418 A1 | 2/2004 | Ederer et al. |
| 2004/0035542 A1 | 2/2004 | Ederer et al. |
| 2004/0056378 A1 | 3/2004 | Bredt et al. |
| 2004/0094058 A1 | 5/2004 | Kasperchik et al. |
| 2004/0145088 A1 | 7/2004 | Patel et al. |
| 2004/0170765 A1 | 9/2004 | Ederer et al. |
| 2005/0017394 A1 | 1/2005 | Hochsmann et al. |
| 2005/0167872 A1 | 8/2005 | Tsubaki et al. |
| 2005/0280185 A1* | 12/2005 | Russell .................. B29C 64/165 425/375 |
| 2005/0283136 A1 | 12/2005 | Skarda |
| 2006/0105102 A1 | 5/2006 | Hochsmann et al. |
| 2006/0175346 A1 | 8/2006 | Ederer et al. |
| 2006/0208388 A1 | 9/2006 | Bredt et al. |
| 2007/0045891 A1 | 3/2007 | Martinoni et al. |
| 2008/0001331 A1 | 1/2008 | Ederer |
| 2011/0300248 A1* | 12/2011 | Tung .................... B29C 64/329 425/90 |
| 2014/0363585 A1* | 12/2014 | Pialot .................... B29C 64/255 427/551 |
| 2015/0139849 A1* | 5/2015 | Pialot, Jr. ............. B23K 26/342 425/174 |
| 2018/0304302 A1 | 10/2018 | Sachs et al. |
| 2018/0304357 A1 | 10/2018 | Myerberg et al. |
| 2018/0354190 A1* | 12/2018 | Todorov ................ B33Y 10/00 |
| 2019/0060998 A1* | 2/2019 | Kelkar .................. B33Y 40/00 |
| 2020/0238432 A1* | 7/2020 | Hayashi ................ B29C 64/209 |
| 2021/0221060 A1* | 7/2021 | Lee ....................... B29C 64/165 |

FOREIGN PATENT DOCUMENTS

| | | |
|---|---|---|
| WO | 95/05943 A1 | 3/1995 |
| WO | 95/18715 A1 | 7/1995 |
| WO | 96/05038 A1 | 2/1996 |
| WO | 00/03324 A1 | 1/2000 |
| WO | 00/21736 A1 | 4/2000 |
| WO | 00/51809 A1 | 9/2000 |
| WO | 01/34371 A2 | 5/2001 |
| WO | 01/72502 A1 | 10/2001 |
| WO | 02/26419 A1 | 4/2002 |
| WO | 02/26420 A1 | 4/2002 |
| WO | 02/26478 A1 | 4/2002 |
| WO | 02/28568 A2 | 4/2002 |
| WO | 02/064353 A1 | 8/2002 |
| WO | 02/064354 A1 | 8/2002 |
| WO | 02/083323 A2 | 10/2002 |
| WO | 03/016030 A1 | 2/2003 |
| WO | 03/016067 A2 | 2/2003 |
| WO | 03/086726 A1 | 10/2003 |
| WO | 03/097518 A2 | 11/2003 |
| WO | 03/103932 A1 | 12/2003 |
| WO | 2004/010907 A1 | 2/2004 |

(56) References Cited

FOREIGN PATENT DOCUMENTS

| WO | 01/26885 A1 | 4/2004 |
|---|---|---|
| WO | 2004/110719 A2 | 12/2004 |
| WO | 2004/112988 A2 | 12/2004 |
| WO | 2005/080010 A1 | 9/2005 |
| WO | 2005082603 A1 | 9/2005 |
| WO | 2005/113219 A1 | 12/2005 |
| WO | 2005097476 A2 | 12/2005 |
| WO | 2013178825 A2 | 12/2013 |

OTHER PUBLICATIONS

Rishmawi, Issa et al., "Tailoring green and sintered density of pure iron parts using binder jetting additive manufacturing", Additive Manufacturing, (2018), 13 pages.

* cited by examiner

POWDER SPREADING APPARATUS AND SYSTEM

CROSS REFERENCE TO RELATED APPLICATIONS

This application relates to and claims the benefit of U.S. Provisional Patent Application Ser. No. 63/011,343 filed on Apr. 17, 2020 entitled "POWDER SPREADING MECHANISM", which is incorporated herein by reference in its entirety.

TECHNICAL FIELD

In general, the present invention relates to a powder spreading apparatus, and more particularly to a powder spreading apparatus for applying powdered materials in thin layers at high speeds.

BACKGROUND OF THE INVENTION

Three-dimensional (3D) Printers have become crucial equipment in modern manufacturing processes. One specific application of a 3D printer is a 3D binder jet printer that can be used for making ceramic or sand-based parts. In prior art two-piston arrangements of 3D printers, depending on the operator's practices and how the powder is used, there can be a large variation of supply powder density from job to job. Powder can be insufficiently packed, leading to insufficient powder in the build process, short spreading (incomplete layers), and a wasted run. Powder can also be overpacked, in which case the roller or gantry motors stalls out when trying to carve off powder. Another failure mode can be caused where the media is packed into a brick like state, and excessive wall friction combined with the mass of the powder prevents the feed piston from moving up enough to supply a full dose of powder, or even stalls completely. During the printing process, repeatedly passing the spreader roller over the feed piston continues to pack powder, so stalling can happen mid build.

Further, prior art 3D printers can provide a variable powder density from one side of a work area to the other, and also powder density variations from layer to layer. Other issues caused by prior art systems include short spreading, where insufficient powder supply results in incomplete layers or trenches in the build piston, layer shifting resulting from too much horizontal force pushing the early layers in the direction of spread, or insufficient powder density near the end of the layers, which can cause the part to tip forward, or compress down into the lighter build powder. Any of these failures can cause a scrap part.

It would be desirable to provide a 3D printing system that can apply powdered materials having an accurate density, and at high speeds.

SUMMARY OF THE INVENTION

According to one aspect of the disclosure, a powder spreading apparatus includes a hopper having a first end, a second end opposite from the first end, a front wall, a rear wall opposite from the front wall, and a floor. The front wall, the rear wall, the first end, the second end, and the floor define an interior. An impeller is disposed within the interior of the hopper, and the impeller includes a plurality of circumferentially spaced flutes. The impeller is configured to rotate about an impeller axis that extends from the first end of the hopper to the second end of the hopper. A spreader rod is coupled to the hopper and extends along a spreader rod axis parallel to the impeller axis. The spreader rod is configured to rotate about the spreader rod axis.

According to one embodiment of the apparatus, the powder spreading apparatus further includes a gantry, wherein the hopper is coupled to the gantry.

According to one embodiment of the apparatus, the powder spreading apparatus further includes a gantry motor configured to move the gantry, an impeller motor configured to rotate the impeller, and a spreader rod motor configured to rotate the spreader rod.

According to one embodiment of the apparatus, the powder spreading apparatus further includes a controller, wherein the controller is configured to independently control each of the gantry motor, the impeller motor, and the spreader rod motor.

According to one embodiment of the apparatus, the controller is configured to drive at least one of the gantry motor, the impeller motor, or the spreader rod motor at a set target speed with respect to gantry position.

According to one embodiment of the apparatus, the controller is configured to drive the gantry motor, the impeller motor, and the spreader rod motor in pre-defined speed ratios.

According to one embodiment of the apparatus, the controller is configured to: operate the impeller motor to start depositing powder in a print area as the gantry moves the hopper across the print area; operate the spreader rod motor to start the spreader rod and smooth out the powder; and upon the gantry reaching a predetermined position, stop operation of the impeller motor to stop depositing the powder while continuing to operate the spreader rod motor.

According to one embodiment of the apparatus, the floor of the hopper includes a slot located below the impeller axis.

According to one embodiment of the apparatus, the floor includes a central portion directly beneath the impeller axis, a rear portion between the rear wall and the central portion, and a front portion between the central portion and the front wall.

According to one embodiment of the apparatus, the slot is located in the central portion of the floor.

According to one embodiment of the apparatus, the slot is located in the rear portion of the floor.

According to one embodiment of the apparatus, the slot is located in the front portion of the floor.

According to one embodiment of the apparatus, the slot includes a tooth extending into the interior of the hopper towards the impeller.

According to one embodiment of the apparatus, a tip of the tooth is spaced apart from the plurality of flutes by a distance of between 0.65 millimeters and 6.5 millimeters.

According to one embodiment of the apparatus, the hopper further includes a shelf arranged within the interior of the hopper and overhanging at least a portion of the impeller.

According to one embodiment of the apparatus, a width of the hopper from the front wall to the rear wall tapers from a top of the hopper to the floor.

According to one embodiment of the apparatus, the hopper is configured to store a volume of powder, and the width of the hopper tapers such that the volume of powder exerts a compressive force on between 25% and 50% of a perimeter of the impeller.

According to one embodiment of the apparatus, the plurality of flutes are spaced from an interior wall of the floor by a gap distance, and the gap distance increases from the slot towards the rear wall along a length of the floor.

According to one embodiment of the apparatus, the powder spreading apparatus further includes a build box that includes a print area configured to receive a layer of powder from the hopper, and a buffer zone surrounding the print area, wherein dimensions of the buffer zone are predetermined based at least partially upon characteristics of powder within the hopper.

According to one embodiment of the apparatus, the buffer zone is configured to collect excess powder that falls outside of the print area.

According to one aspect of the disclosure, a powder spreading apparatus includes a gantry configured to move across a print area along at least one axis. The powder spreading apparatus further includes a hopper coupled to the gantry, the hopper having a first end, a second end opposite from the first end, a front wall, a rear wall opposite from the front wall, and a floor, wherein the front wall, the rear wall, the first end, the second end, and the floor define an interior. The powder spreading apparatus further includes an impeller disposed within the interior of the hopper. The impeller is configured to rotate about an impeller axis that extends from the first end of the hopper to the second end of the hopper. The powder spreading apparatus further includes a spreader rod coupled to at least one of the gantry or the hopper, and extending along a spreader rod axis parallel to the impeller axis. The spreader rod is configured to rotate about the spreader rod axis.

According to one embodiment of the apparatus, the powder spreading apparatus further includes one or more inkjets coupled to at least one of the gantry or the hopper.

According to one aspect of the disclosure, a method of applying a powder to a print area includes operating an impeller to start depositing powder from a hopper into a print area as a gantry moves the hopper in a first direction across the print area; operating a spreader rod to smooth out the powder on the print area as the gantry moves the hopper and the spreader rod across the print area in the first direction; and upon the gantry reaching a predetermined position in the print area, stopping the impeller to stop depositing the powder while continuing to operate the spreader rod.

According to one embodiment of the method, the method further includes depositing an ink through one or more inkjets as the gantry moves the hopper in a second direction opposite the first direction, across the print area.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Embodiments of the invention relate to a powder spreading apparatus that can be used as part of a three-dimensional (3D) printer, such as a 3D binder jet printer. The powder spreading apparatus can include a hopper configured to contain a volume of powder. The powder spreading apparatus further includes an impeller within the hopper's interior to dispense the powder through a slit in the floor of the hopper to create a layer of powder on a print area. A spreader rod rotates and rolls over the layer of powder to compact and smooth the powder. Compared to prior art 3D printers, the present embodiments can operate more consistently and provide a layer of powder faster while also creating less variation of powder density across a print area. Through use of the various features of the present embodiments, the powder density variations within a build can be minimized to the point that the standard deviation across a build area, from left to right as well as from front to back can be less than 0.01 g/cm^3.

The best mode for carrying out the invention will now be described for the purposes of illustrating the best mode known to the applicant at the time of the filing of this patent application. The examples and figures are illustrative only and not meant to limit the invention, which is measured by the scope and spirit of the claims.

Figure 1:
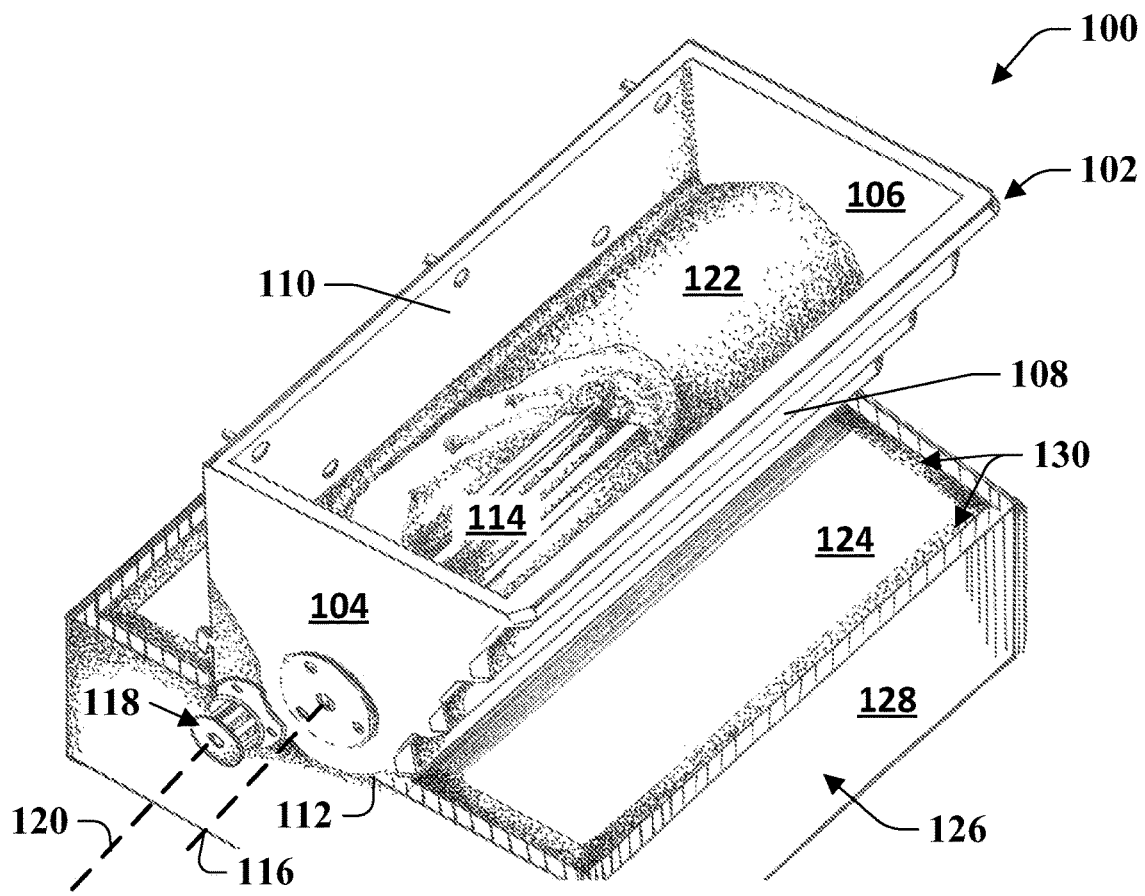
FIG. 1 is a perspective view of an exemplary powder spreading apparatus.

Referring now to the drawings, wherein the showings are for the purpose of illustrating exemplary embodiments of the invention only and not for the purpose of limiting same, FIG. 1 illustrates a powder spreading apparatus 100 for providing multiple stages of compression to consistently work fine powder blends into a target density during a powder handling and deposition process.

The powder spreading apparatus can include an onboard material hopper 102. The hopper 102 can include a first end 104, a second end 106 opposite the first end, a front wall 108, a rear wall 110 opposite the front wall, and a floor 112, each defining an interior of the hopper 102. In certain embodiments, the hopper 102 can have a cover on its top side. The cover can be opened manually, or it may be actuated or controlled through various methods commonly used in the art, including by operation of the controller 200 (shown in FIG. 2). The powder spreading apparatus 100 can further include an impeller 114 disposed within the interior of the hopper 102. In certain embodiments, the impeller 114 can include a plurality of flutes circumferentially spaced around the impeller 114. The impeller 114 is configured to rotate about an impeller axis 116 that extends from the first end 104 of the hopper 102 to the second end 106 of the hopper 102. The powder spreading apparatus 100 can further include a spreader rod 118 coupled to the hopper 102 and extending along a spreader rod axis 120 that extends parallel to the impeller axis 116. It should be appreciated that the spreader rod 118 can be coupled directly to the hopper 102 or coupled indirectly to the hopper 102 via another component.

As shown, the hopper 102 can be filled with and transport a suitable material, such as a powder 122. The impeller 114 can be rotated to compress the powder 122 as it is dispensed onto a print area 124, which may include a previous powder layer, in a build box 126 defined by walls 128. The spreader rod 118 can then pass over and smooth the pre-compressed new powder layer. The spreader rod 118 can provide leveling and compaction to the powder without transporting the powdered materials for any nominal distance. A buffer zone 130 surrounds the print area 124 and is predetermined based upon characteristics of the powder and a set of operating conditions. The buffer zone 130, which surrounds the print area 124 collects any excess powder without the use of an overflow device or receptacle.

Figure 2:
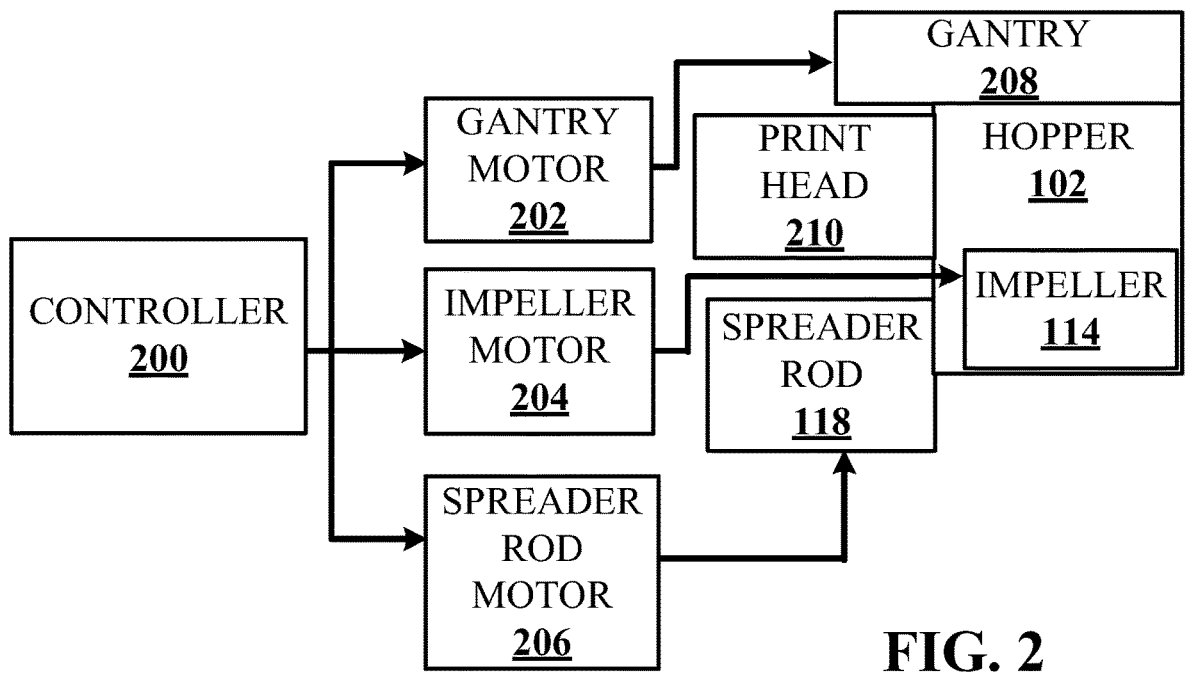
FIG. 2 is a schematic view of an exemplary powder spreading apparatus.

Turning now to FIG. 2, the powder spreading apparatus can include a controller 200. Controller 200 can be a programmable logic controller (PLC), a microprocessor, control circuitry, a computer numerical control (CNC) controller, among others. It should be appreciated that the controller 200 can include a single controller or multiple controllers. The powder spreading apparatus 100 can further include a gantry motor 202, an impeller motor 204, and a spreader rod motor 206. Each of these motors can be any of a servo motor, a stepper motor, a linear motor, a direct drive motor, a vibratory motor, a DC brushless motor, a DC brushed motor, an AC brushless motor, among others. The controller 200 can be configured to operate each of the gantry motor 202, the impeller motor 204, and the spreader rod motor 206 independently of one another.

The powder spreading apparatus can further include a gantry 208 upon which the hopper 102 is mounted. The gantry 208 can support the hopper 102, the impeller 114, and the spreader rod 118. The gantry motor 202 is configured to move the gantry 208, for example, along print area 124 in the build box 126. The gantry 208 can be configured to move along one or more axes. The impeller motor 204 is configured to rotate the impeller 114, and the spreader rod motor 206 is configured to rotate the spreader rod 118. The powder spreading apparatus 100 can further include a print head 210. In certain embodiments, the print head 210 can be coupled to the gantry 208. In other embodiments, the print head 210 can be coupled to the hopper 102. The print head 210 can include one or more inkjets. It should be appreciated that the controller 200 can also control operation of the print head 210, or the print head 210 may have its own dedicated print head controller.

Figure 3:
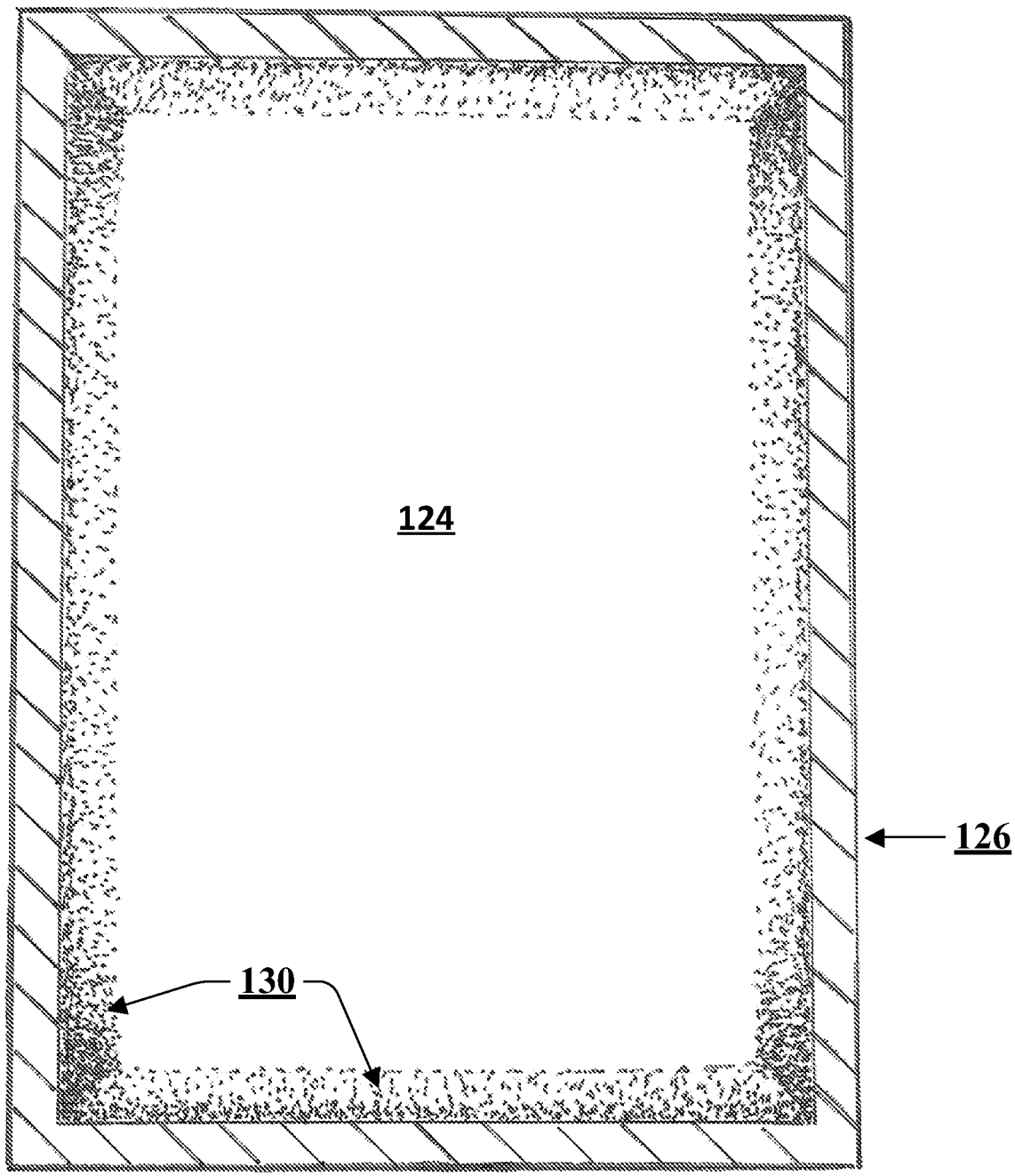
FIG. 3 is a top view of a build box defining a print area in which a powder spreading apparatus can deposit powder.

FIG. 3 shows a top view of the build box 126, with the print area 124 and the buffer zone 130 that surrounds the print area 10. The buffer zone 130 may have a smaller area than the print area 124. By providing a print area 124 larger than the buffer zone 130, waste powder is reduced.

Figure 4:
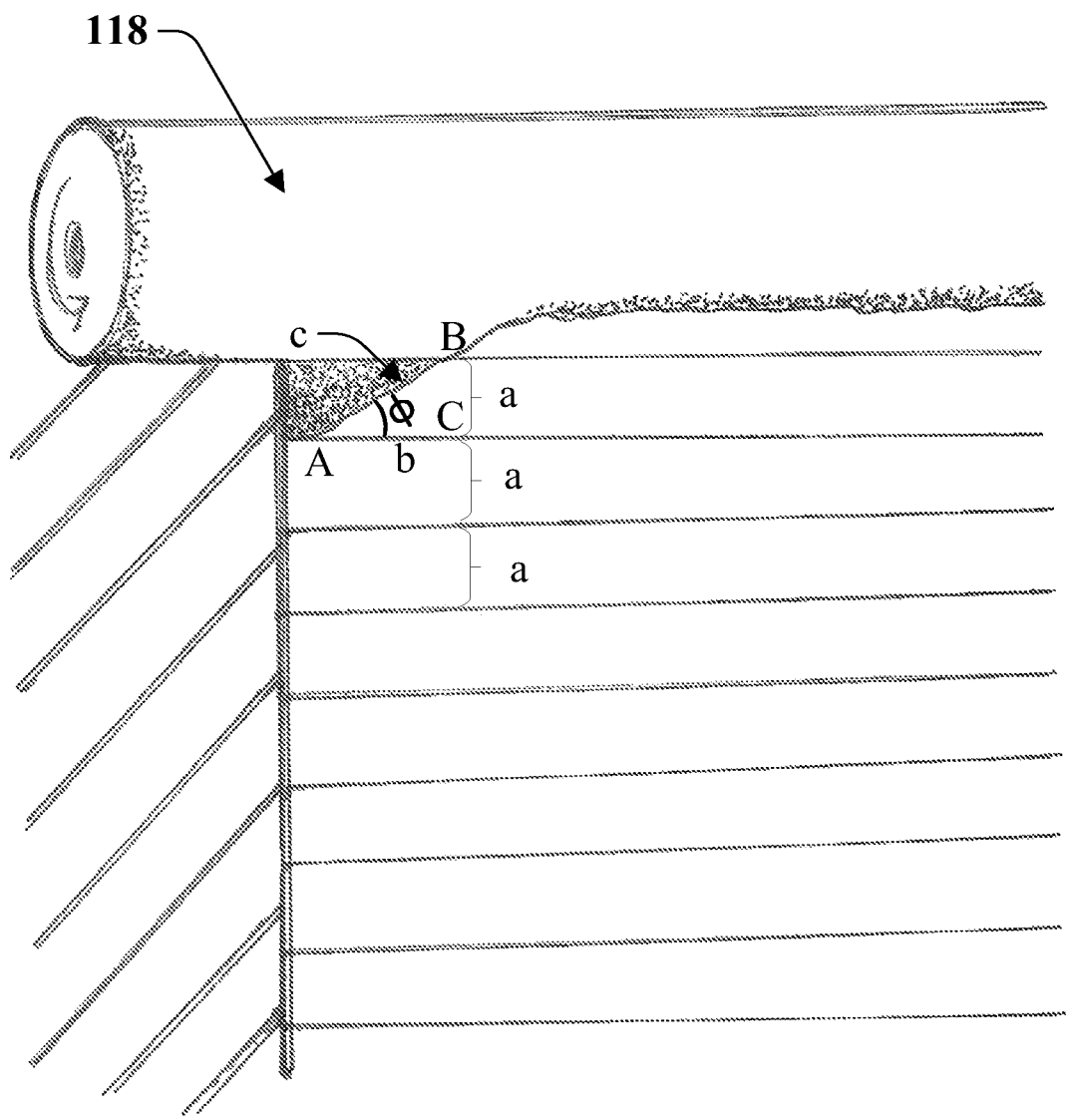
FIG. 4 is a diagram depicted layers of printing process.

FIG. 4 depicts a cross-section of multiple layers of powder beneath the spreader rod 118. The layer actively being spread is layer B and layer C is the previously spread layer that is adjacent to layer B. The width of the buffer zone 130 can be approximated, for example by calculating the length of the lower (horizontal) leg of a triangle (b), where the layer thickness (a) is known as an input to the controller 200, and the lower angle (A) is approximated by the Angle of Repose for the powder 122, which can be determined through material testing. Such calculations can also be made using the internal friction angle, or wall friction angle between specific powders and hardware materials of construction. Due to the material being compressible, the buffer zone 130 can be sized between one-half and five times the length of the lower leg (b). The value of b can be calculated by using the equation: $b=(a*\sin(B))/\sin(A))$. It should be appreciated that the buffer zone may be wider for some powders. The powder interface between layer B and layer C is shown as approximately the hypotenuse (c) of triangle (b).

Figure 5:
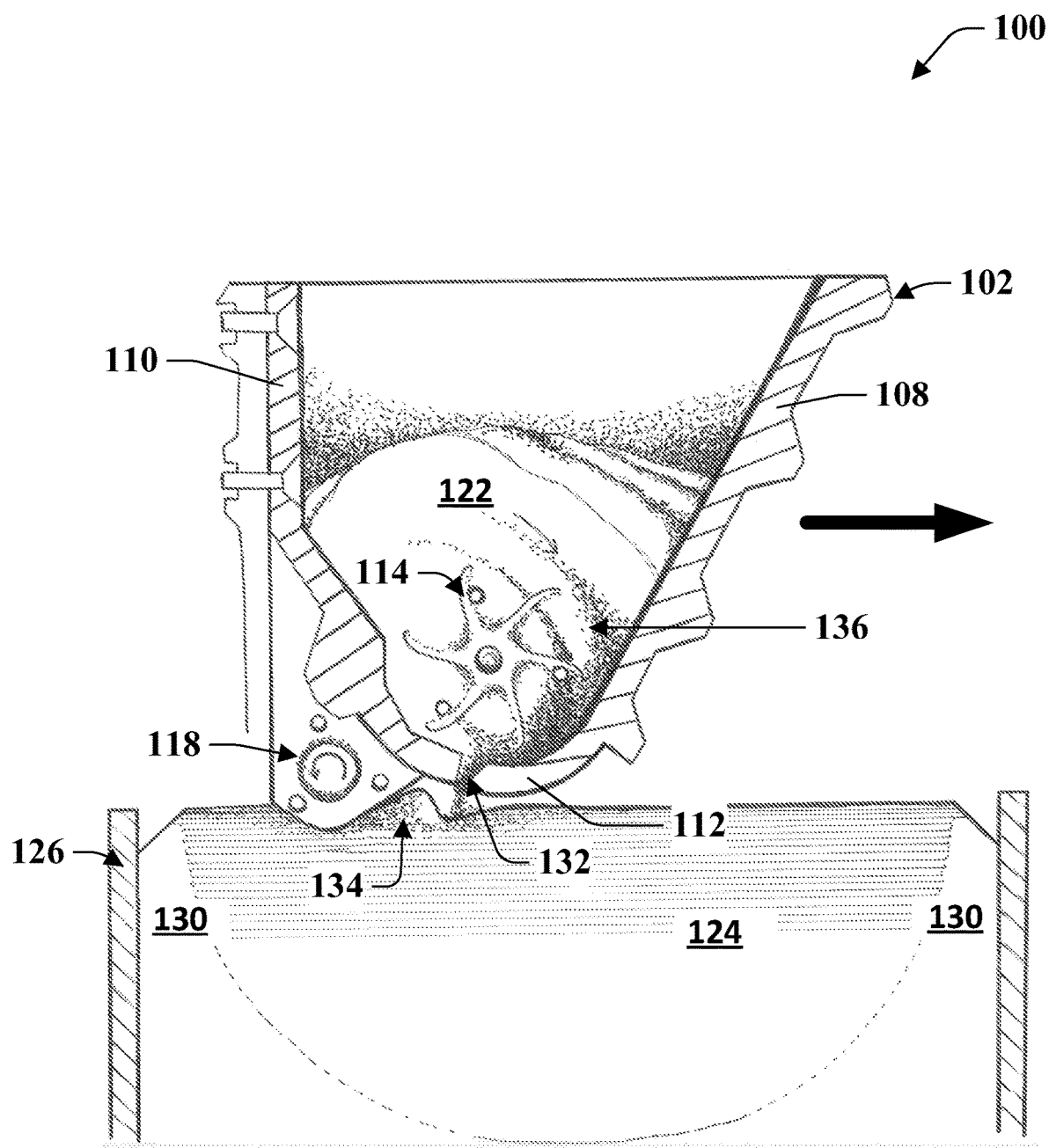
FIG. 5 is a side cross-section view of an exemplary powder spreading apparatus.

Turning now to FIG. 5, the powder 122 can be dispensed from the hopper 102 through a dispensing slot 132 that feeds the powder 122 into a new layer, pre-compressed for smoothing and ready for further compression in region 134. In certain embodiments, the slot 132 can have an articulated closure to prevent powder leaks from occurring. This closure can be manually actuated, passively actuated through interactions with other machine components, or actuated via a mechanical device operated by the controller 200. Compression of the powder 122 in the hopper 102 occurs in a narrowing zone 136 between the impeller 114 and the walls of the hopper 102. Specifically, the width of the hopper 102 between the front wall 108 and the rear wall 110 can taper from the top of the hopper 102 to the floor 112 to create the narrowing zone 136. As the hopper 102 moves forward (e.g. by way of the gantry 208 moving forward), the rotating spreader rod 118 further compresses and smooths the powder 122 in region 134.

Figure 6:
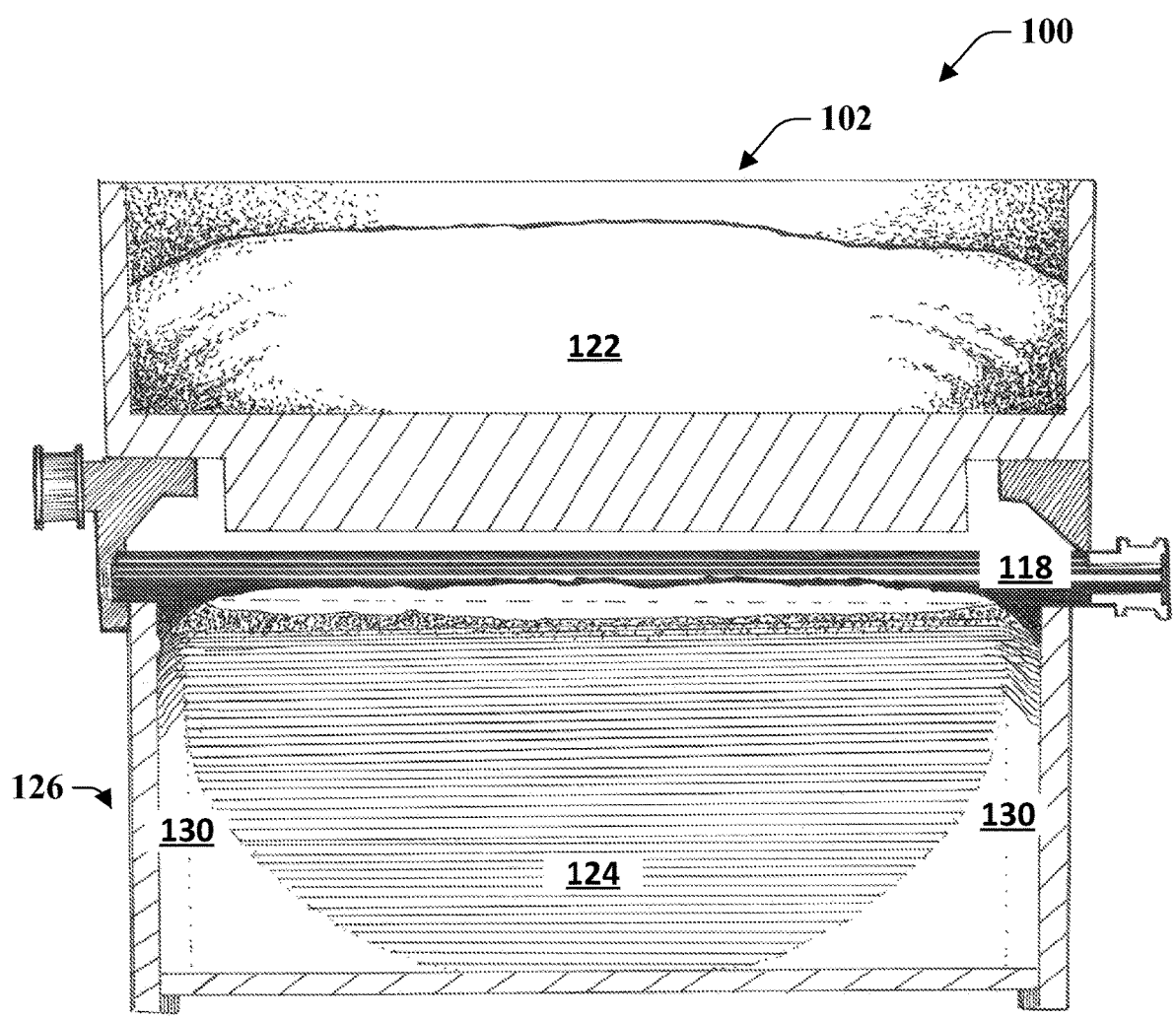
FIG. 6 is a front cross-section view of an exemplary powder spreading apparatus.

FIG. 6 shows a front cross-sectional view with the spreader rod 118 traveling toward the viewer. The hopper 102 can be narrower than the build box 126, but at least as wide as the intended print area 124. The spreader rod 118 can also have a width greater than that of the print area 124 and the buffer area 130. The spreader rod 118 travels horizontally at a height lower than the hopper 102. Excess powder, if moving perpendicular to the direction of spread, is lightly compressed into the buffer region 130, which may have a lower density of powder than the print area 124.

The width of the buffer area 130 can be chosen to be approximately one to five times wider than the internal shear angle of the powder under similar level of consolidation forces. The width of the buffer area 130 can be calculated based on the shear angle of the powder in flow. Different build boxes 126 of varying widths may be utilized for different powders, based on their flow behavior. Likewise, a variable slot 132 width, or chokes, could be employed to make the print area 124 smaller, while holding the build box 126 size constant. In certain embodiments, the build box 126 walls on either end of the spreader rod 118 can be taller than the left or right box walls, to prevent overflow of difficult materials on the floor—thereby ensuring a clean and low maintenance build process, without dropping powder 122 to side overflow chutes or otherwise allowing build up in the path of the print head.

Figure 7:
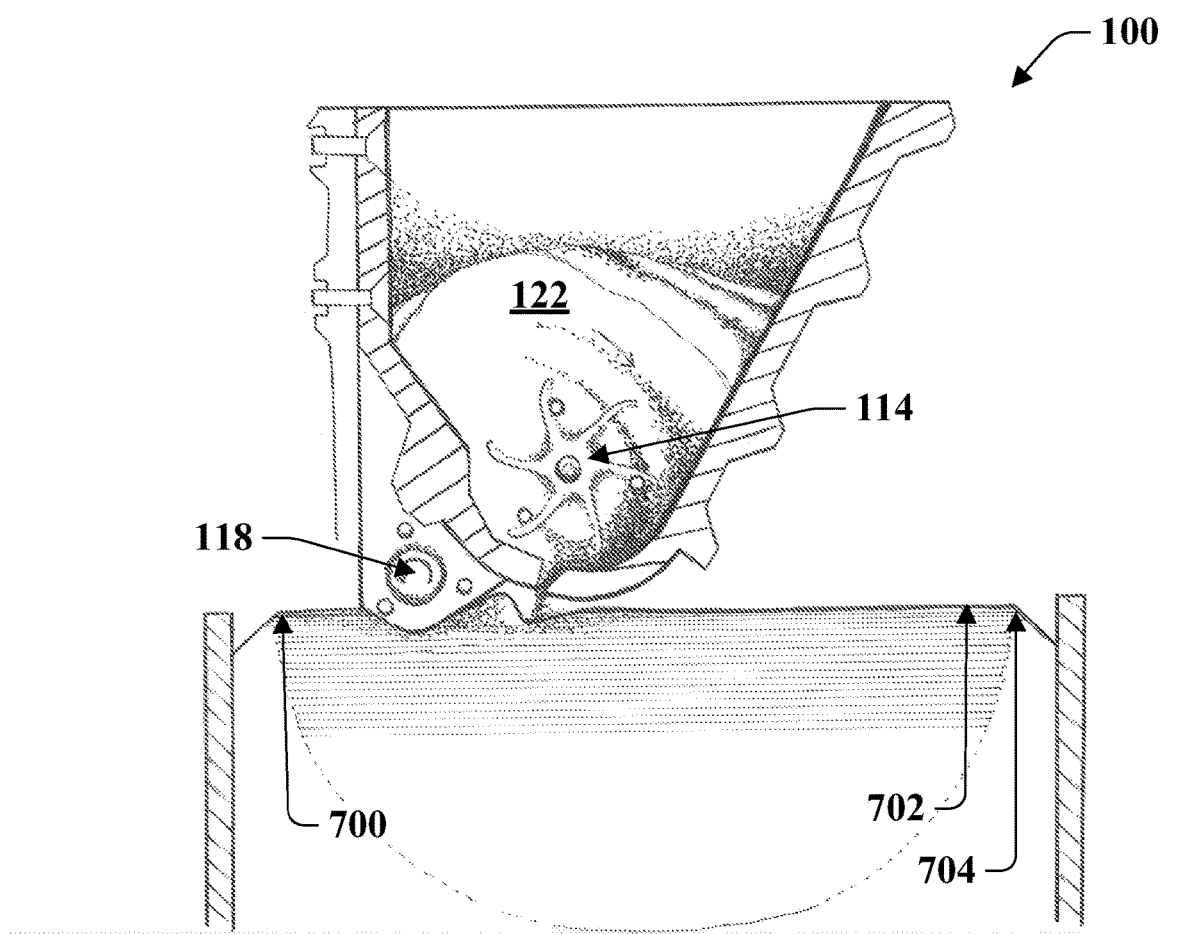
FIG. 7 is a side cross-section view of an exemplary powder spreading apparatus.

Turning now to FIG. 7, one embodiment of a powder deposition process is depicted from a side cross-section view. At position 700, at the beginning of powder 122 deposition, the impeller 114 starts to turn, depositing pre-worked powder 122 in front of the spreader rod 118. Powder 122 deposition continues across the print area 124 up to position 702, which corresponds to the beginning of the buffer area 130 for the end of travel in the spreading direction. At position 702, the impeller 114 stops turning, which stops the delivery of powder 122 to the print area 124. The spreader rod 118 continues to rotate over the buffer area 130, compacting any remaining excess powder 122 so that no residual powder drops off the end of the build box 126. The spreader rod 118 can stop at position 704. The boundaries of the buffer area 130 can be adjustable based on powder flow properties so that the machine can be used for a variety of media. Likewise, the position and timing of component stop and start locations may be adjusted.

Figure 8A:
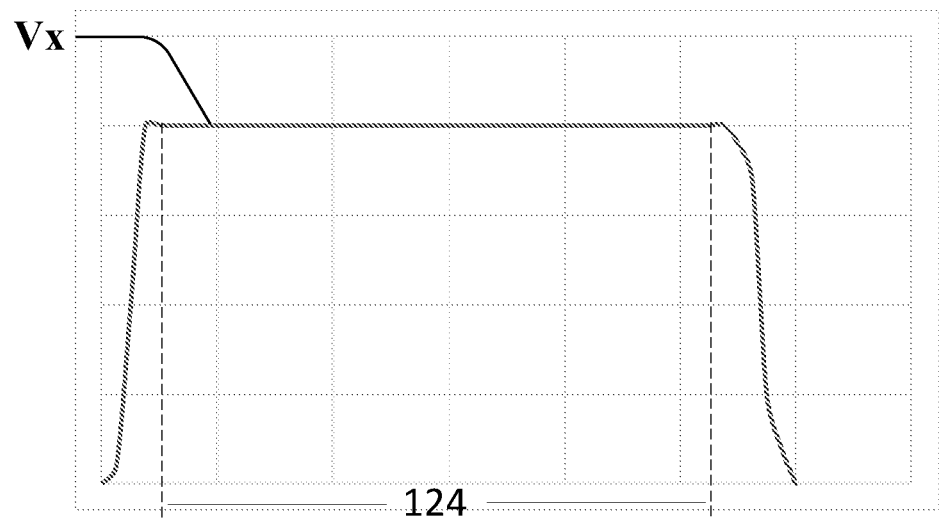
FIG. 8A is a chart of the gantry speed during a printing process.
Figure 8B:
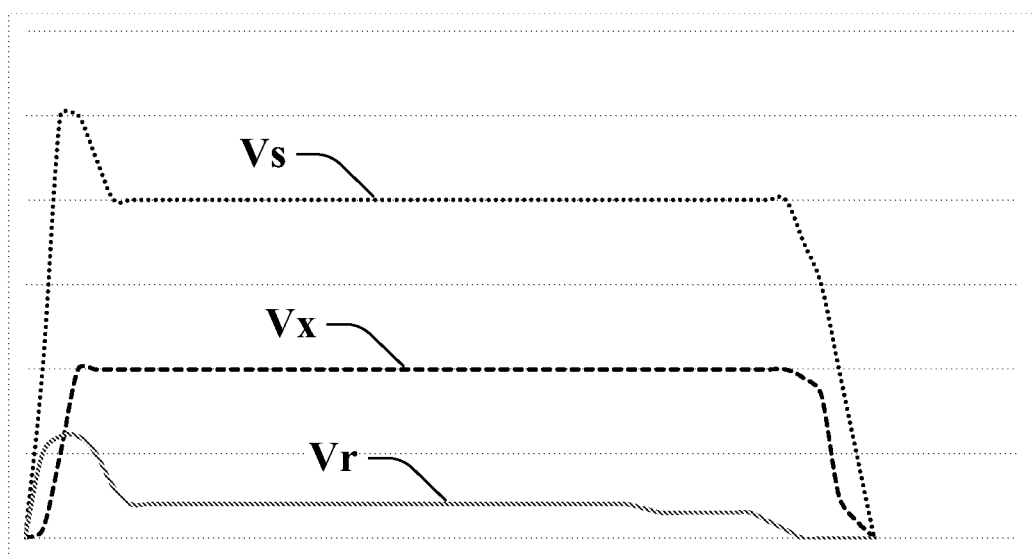
FIG. 8B is a chart of the gantry speed, impeller speed, and spreader rod speed during a printing process.
Figure 8C:
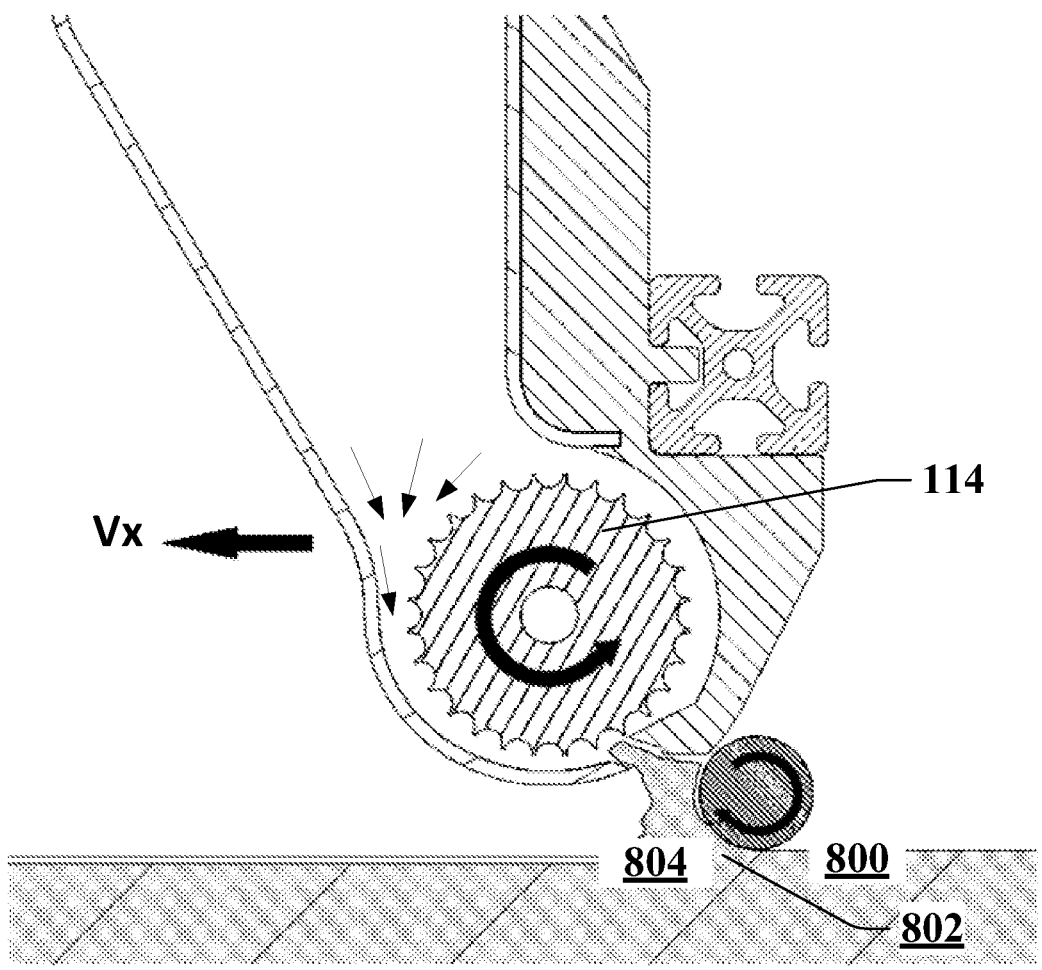
FIG. 8C is a side cross-section view of an exemplary arrangement of an impeller within a hopper, showing representations of gantry speed, impeller speed, and spreader rod speed.

FIGS. 8A, 8B, and 8C correlate the components, velocity, and deposition rate of the powder deposition apparatus 100 components during a printing process, for example as they relate to the conditioning and deposition of the powder 122. FIG. 8A illustrates that the gantry 208 travels at an essentially constant velocity during powder 122 deposition. Acceleration and deceleration ramps can occur outside of the print area 124, but they may overlap the buffer zone 130 on either end, in order to help reduce the overall length of travel along the particular axis.

FIGS. 8B and 8C graphically illustrate the relationships of the spreading motion speeds with respect to the x-axis position. The gantry speed, Vx, is essentially constant across the print area 124, with the acceleration/deceleration zones at beginning and end. It should be appreciated that variations in either the impeller rate Vr or Vx can result in over or under supply of powder media to the current layer 800 being printed. The rotational velocity Vr of the impeller may vary. Certain powders 122 may benefit from either a fast or slow ramp up, including even an intentional overshoot/under speed of Vr at the beginning of the layer to establish sufficient powder to fill the nip 802 under the roller when the layer begins, and to establish the appropriate powder bead 804 in front of the smoothing device. Likewise, depending on powder properties, the rotational velocity of the smoothing rod Vs can be increased at either end of the spreading process, though generally the compaction is kept constant through the print area 124. The speeds, Vr, Vx, Vs can be independently driven with, for example, stepper, linear, vibratory, or servo motor controls corresponding to the impeller motor 204, the gantry motor 202, and the spreader rod motor 206, independently controlled by the controller 200. In certain embodiments, each motor can be driven at a set target speed, with respect to x position. In other embodiments, the motors can be driven in pre-defined speed ratios, for example, by taking advantage of digital servo-camming software programming. For example, the ratio of Vx and Vr can be changed at the beginning and/or end of travel to achieve target print area density without generating excess material or overflow spillage of powder 122. In an embodiment, Vx may be in the range of five to thirty inches per second, for example between fifteen to twenty inches per second. Vr may be in the range of one to one hundred revolutions per minute (RPM), for example between four to ten RPM. Vs may be in the range of five to one hundred RPM, for example between twenty to fifty RPM. It should be appreciated that the values and ratios will depend on the speed of deposition, target layer thickness, and material flow properties. It should be appreciated that the impeller 114 and the spreader rod 118 may be rotated in either a clockwise or a counter clockwise rotation. In an embodiment, the impeller 114 and the spreader rod 118 rotate in opposing directions.

In certain embodiments, the powder spreading apparatus 100 can self-diagnose the quality of the individual layers by utilizing a scanner to scan the height profile of the layer with a laser, low angle lighting or other such AI vision tools. If a layer is determined to be incomplete or missing materials/powder 122, the controller 200 can return the powder spreading apparatus 100 to such defects, and correct them by selectively depositing additional powder 122 where necessary.

Figure 9:
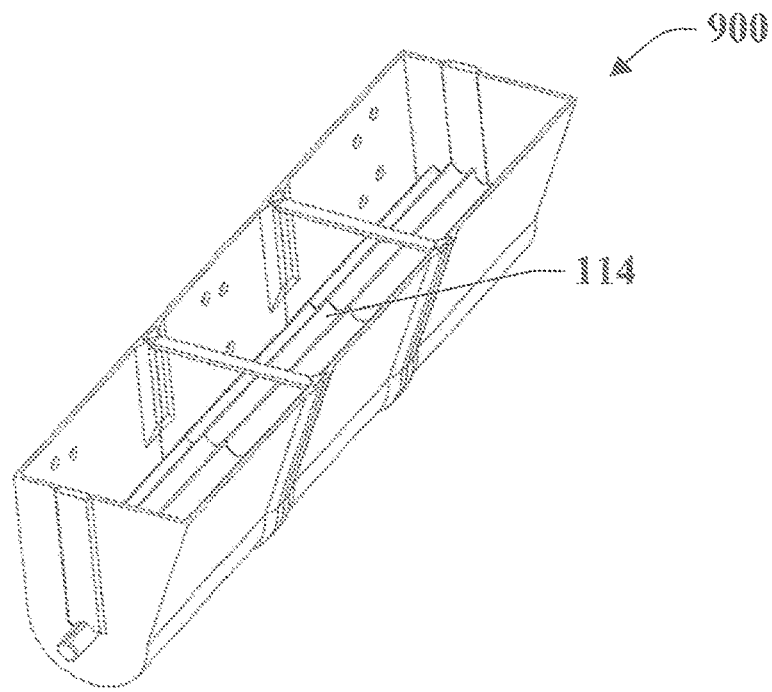
FIG. 9 is a perspective view of an exemplary hopper.

Certain aspects of the hopper 102 shape and design can improve the function of the powder spreading apparatus 100. For example, certain wall geometries of the hopper 102 can result in highly dense, well packed powder 122 around the impeller 114. However, in certain situations, powder 122 stored within a hopper 102 can impose a strong downward pressure on the impeller 114. In some cases, dependent on wall geometry, materials of construction, and the media (e.g. powder) being handled, the braking force of the compacted powder 122 can be sufficient to stall out or torque limit motors, such as impeller motor 204, having a size reasonable to be carried onboard the gantry 208, and/or to cause timing belts to skip teeth while the motors are turning. Adding larger motors and or gear boxes, as is done in industrial applications with rotary vane valves, can add excessive weight for the gantry born component, substantially driving up the cost of the gantry drive system. For example, hopper 900 in FIG. 9 can increase the amount of torque required by the powder spreading apparatus 100. Hopper 900 depicts an impeller 114 that is fully exposed to any downward pressure created by powder 122 stored within the hopper 900.

Figure 10:
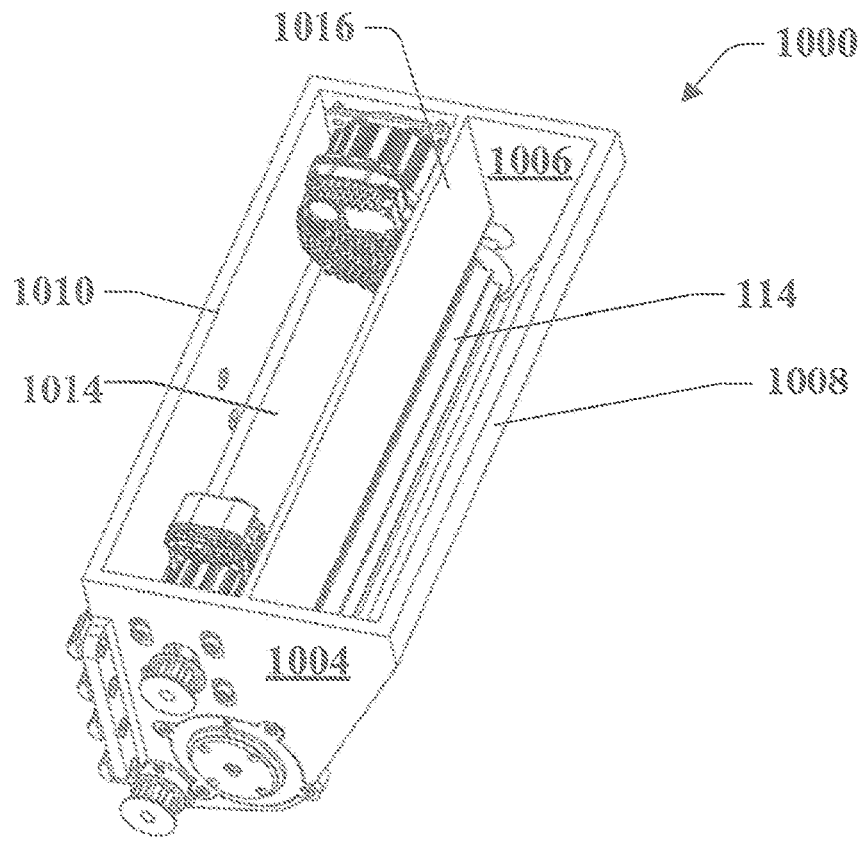
FIG. 10 is a perspective view of an exemplary hopper with a shelf overhanging an impeller.
Figure 11:
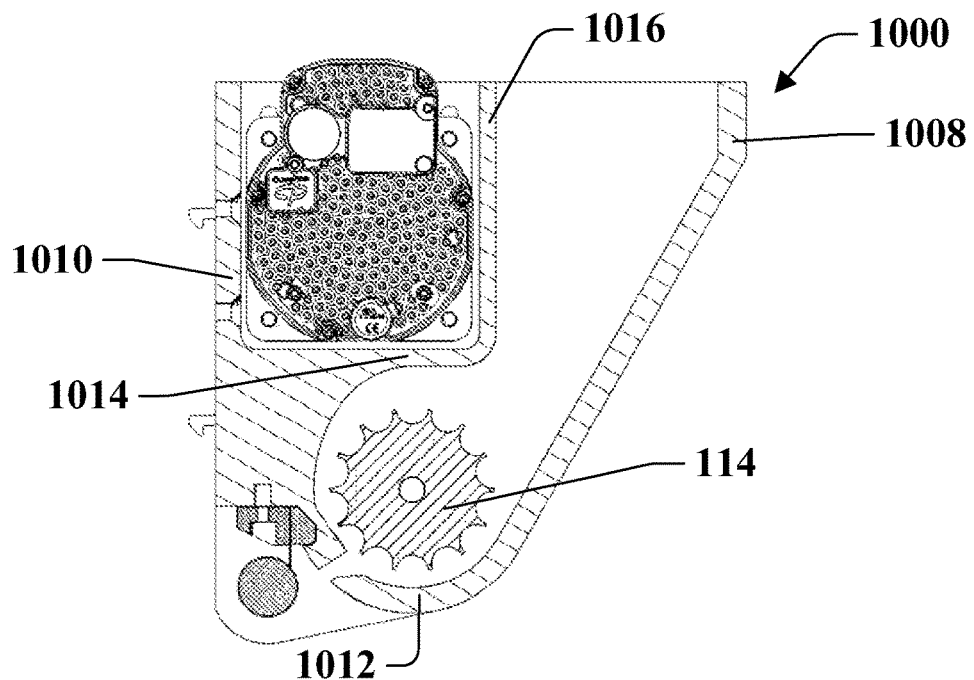
FIG. 11 is a side cross-section view of an exemplary hopper with a shelf overhanging an impeller.

The torque required to turn the impeller can be substantially reduced by reducing or eliminating the vertical load exerted by the powder 122 above the impeller 114. Turning now to FIG. 10 and FIG. 11, another exemplary embodiment of a hopper 1000 is shown. Hopper 1000 includes a shelf 1014, which covers or overhangs a substantial portion of the impeller 114, limiting downward pressure from stored powder 122 on the impeller 114, and reducing the torque required in the system. The shelf 1014 can include a shelf wall 1016 having a steep enough slope to allow for powder flow through the hopper 1000. The shelf 1014 is attached to the rear wall 1010 of the hopper 1000 and overhangs at least a portion of the impeller 114. It should be appreciated that the shelf 1014 can also be attached to the front wall 1008, or one or both of the first end 1004 and second end 1006. In certain embodiments, the shelf 1014 can be a sheet metal insert. The shelf 1014 can also serve as a functional space. For example, in certain embodiments, the shelf 1014 can hold tools, or any of the gantry motor 202, impeller motor 204, or the spreader rod motor 206.

Figure 12:
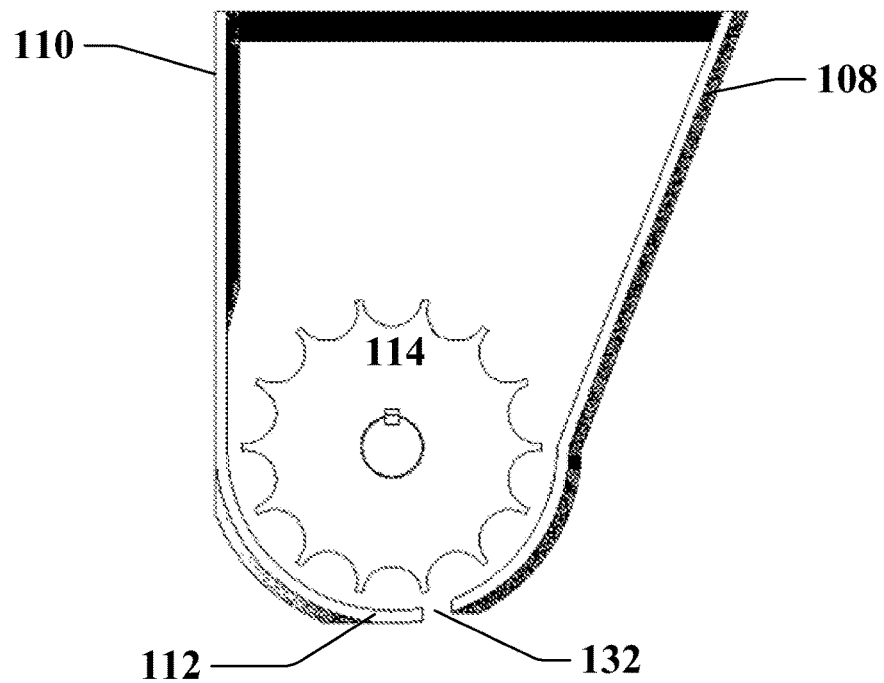
FIG. 12 is a side cross-section view of an exemplary arrangement of an impeller within a hopper.
Figure 13A:
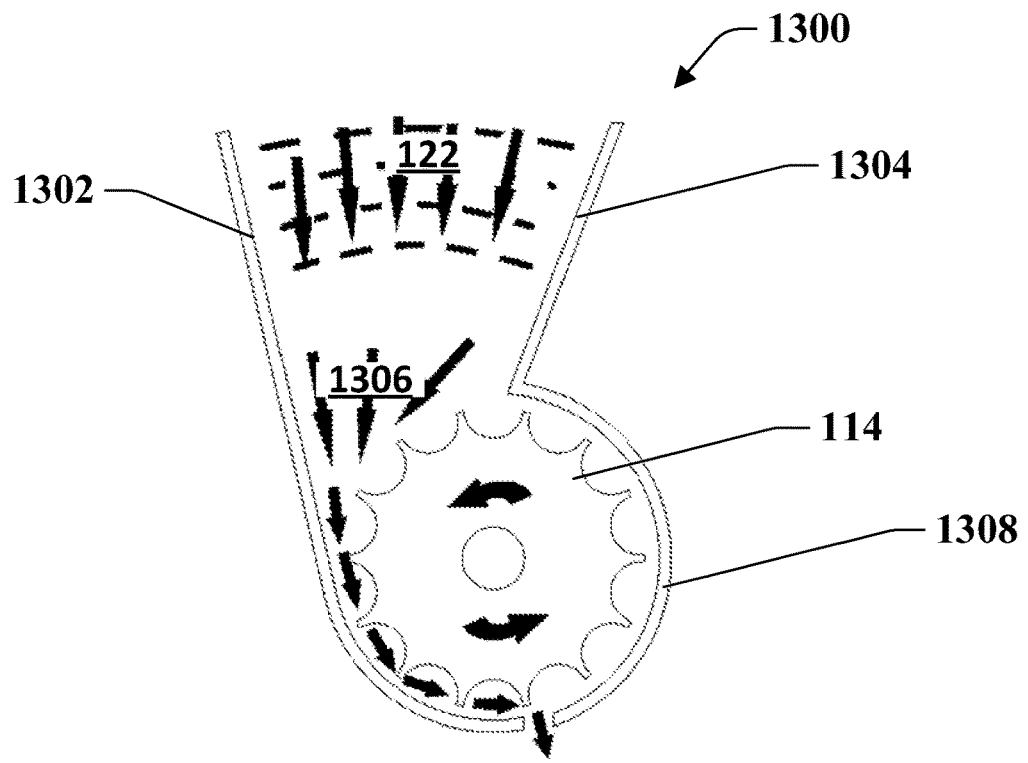
FIG. 13A is a side cross-section view of an exemplary arrangement of an impeller within a hopper.
Figure 13B:
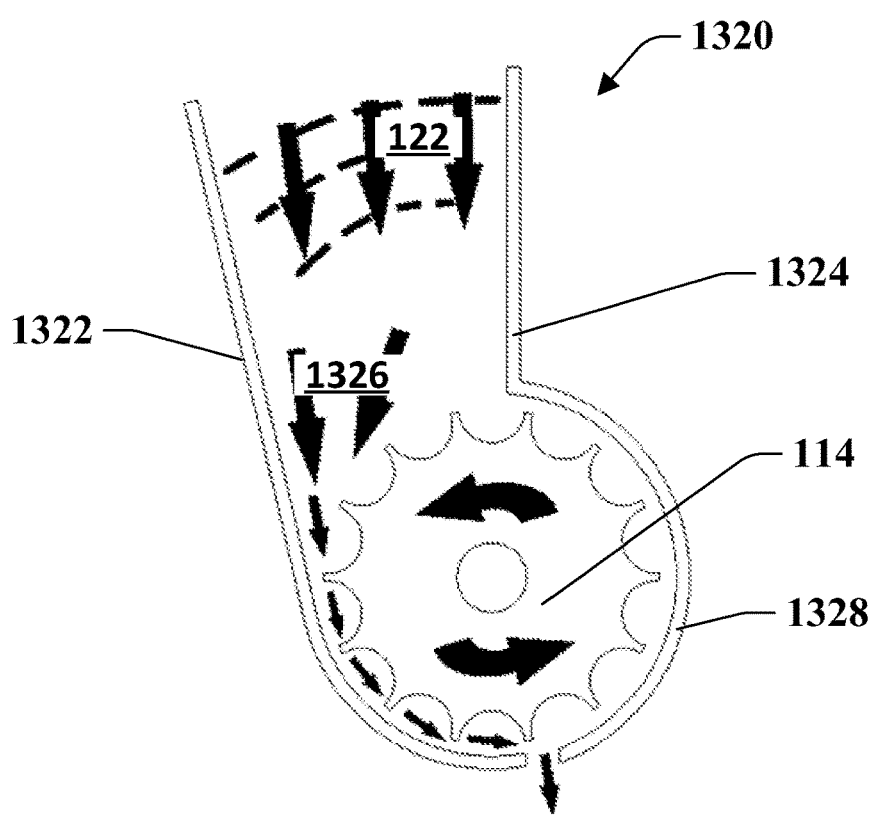
FIG. 13B is a side cross-section view of another exemplary arrangement of an impeller within a hopper.
Figure 13C:
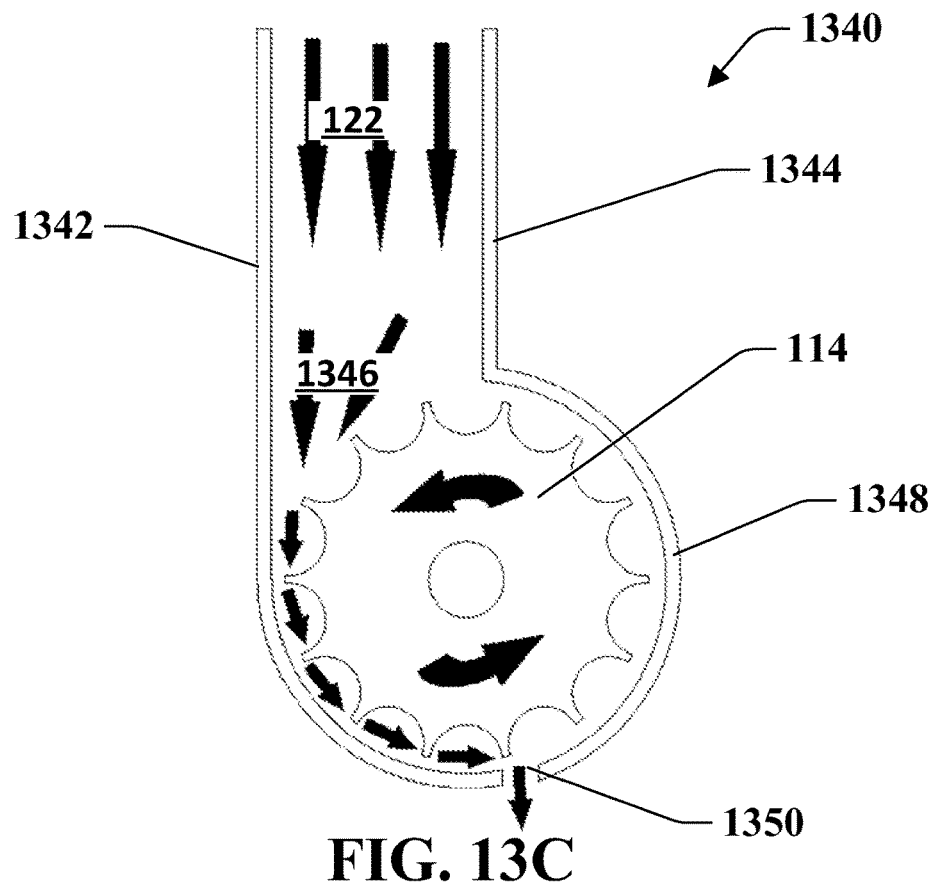
FIG. 13C is a side cross-section view of another exemplary arrangement of an impeller within a hopper.

Turning now to FIG. 12, in certain embodiments, the front wall 108 can be sloped inwards towards the floor 112 while the rear wall 110 remains vertical. In this manner, the width of the hopper 102 from the top of the hopper 102 to the floor 112 tapers. In certain embodiments, cohesive powders can "cake" into the crevices of an impeller 114 and rotate full circle without exiting the device. Such issues can be addressed with varied front wall 108 and rear wall 110 shapes. As shown in FIG. 13A, one or both of the front wall 1302 or the rear wall 1304 can approach the floor 1308 at an inward angle to overhang a portion of the impeller 114. This overhang can reduce the downward pressure from the stored powder 122 on the impeller 114. In this arrangement shown in FIG. 13A, a phenomena of a key stone arch or bridge or dome (shown by the arched dotted lines) can prevent powder 122 from flowing into the impeller feed section 1306 of the impeller 114. The bridging behavior is common with fine powders in hoppers with a converging cross section. In FIG. 13B, bridging can also occur if one of the front wall 1322 or the rear wall 1324 is vertical as the walls approach the floor 1328, if the opposing wall is angled below the wall friction angle, once again yielding a blockage of flow to the feeding section 1326. As shown in FIG. 13C, hopper 1340 can include a front wall 1342 and a rear wall 1344 that are both vertical as the hopper 1340 transitions to the impeller feed area 1346. The floor 1348 curls around the impeller 114 to create an overhang, which can reduce the downward pressure form the stored powder 122 on the impeller 114. The bridging phenomena are substantially eliminated in a hopper such as hopper 1340 with essentially vertical front and rear walls 1342, 1344, though some wall angle can be tolerated with many powder blends.

Consolidation of the powder 122 can still occur with a properly designed feed area 1346 above the impeller 114 section that is exposed to powder 122 in the hopper 1340 above. Design of the feed area 1346 of the hopper 1340 above the impeller 114 to have a converging cross section allows essentially mass flow from the feed area 1346 to the compression zone, where the powder is intentionally worked by the impeller 114 against the front wall 1342, rear wall 1344, and/or floor 1348 to reduce the entrapped air, thereby supplying pre-consolidated powder to the spreader rod 118. The convergence of the hopper walls 1344, 1348 can continue in a Nautilus like shape all the way around to the exit slot 1350, further working the powder between the moving impeller and the front wall 1342, rear wall 1344, and/or floor 1348. As the space available for the powder 122 to occupy is reduced by the convergence of the hopper front wall 1342, the rear wall 1344, and the impeller 144, the loose powder 122 is even further densified, prior to being discharged onto the surface of the powder bed in the print area 124.

Figure 14A:
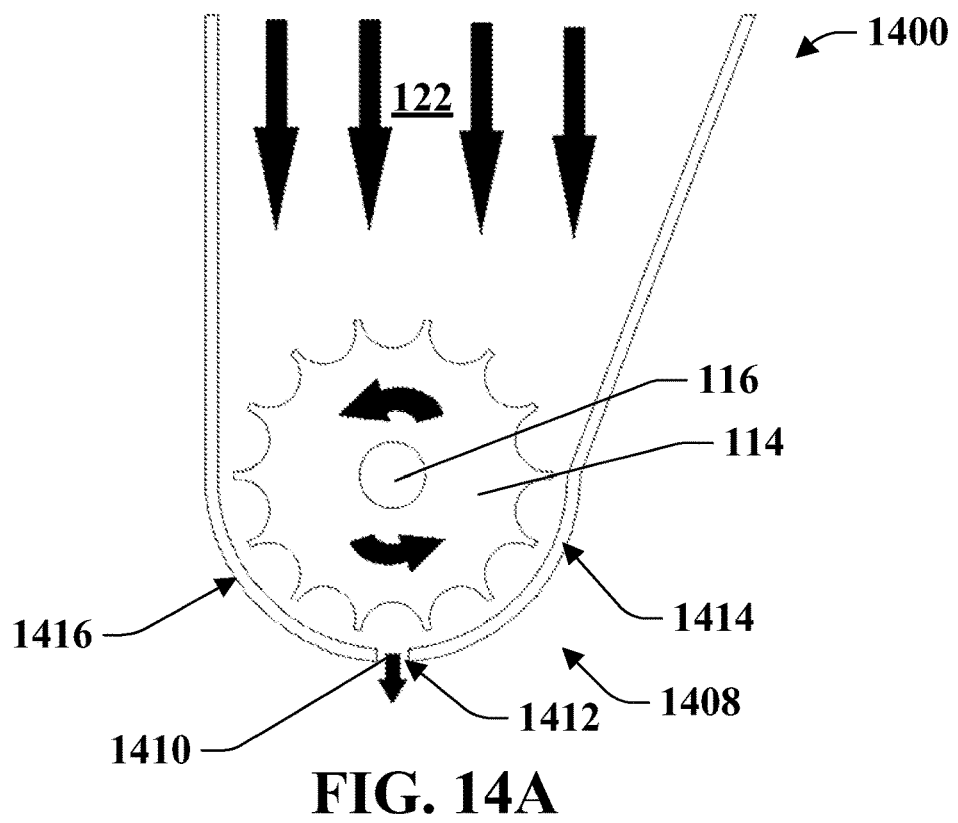
FIG. 14A is a side cross-section view of an exemplary arrangement of an impeller within a hopper.

Some powders 122 are cohesive enough that the compaction in the compression zone is sufficient to cause them to not exit from the slot 132, and rather the powder 122 can compact in the flutes and rotate full circle. This issue can be solved by strategic placement of the slot 132. Turning now to FIG. 14A, hopper 1400 is a bottom-emptying hopper 1400. In various embodiments, the floor 1408 includes a central portion 1412 directly beneath the impeller axis, a rear portion 1414 between the rear wall and the central portion 1412, and a front portion 1416 between the central portion 1412 and the front wall. Hopper 1400 includes a slot 1410 located at the central portion 1412 of the floor 1408. It should be appreciated that the central portion 1412 of the floor is not necessarily the center point of the floor 1408, but rather is at a location directly beneath the impeller axis 116. Certain embodiments of bottom emptying hoppers tend to leak powder as the gantry 208 moves.

Figure 14B:
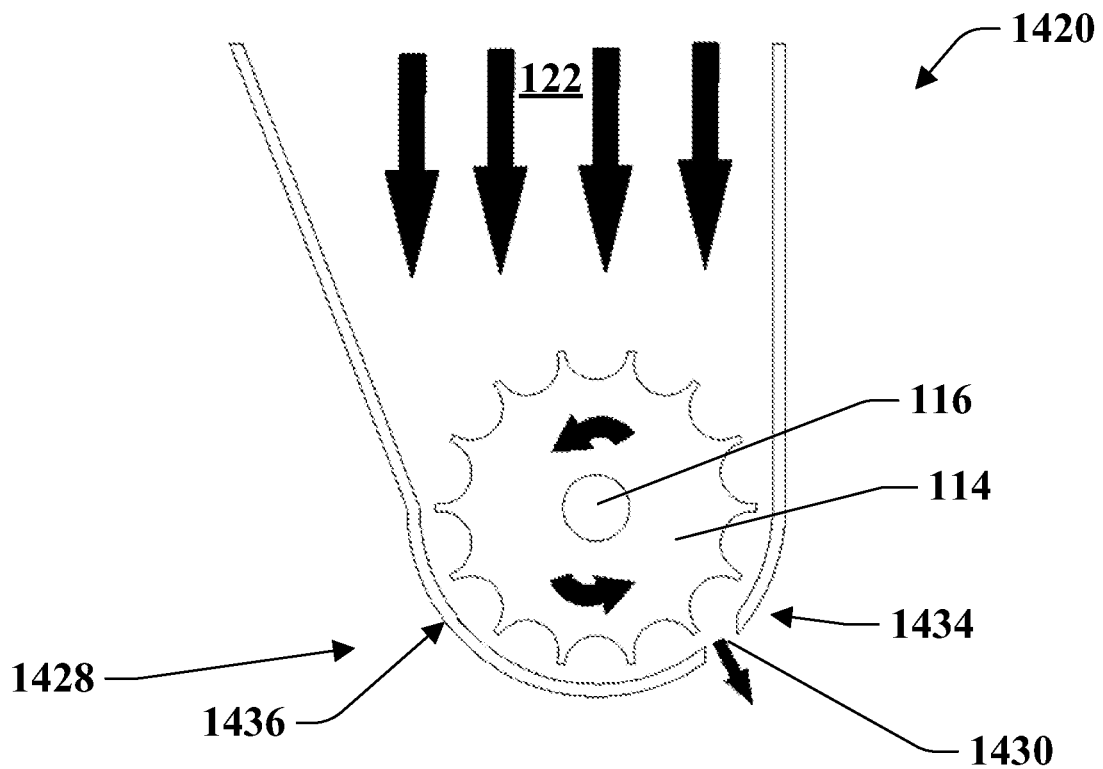
FIG. 14B is a side cross-section view of another exemplary arrangement of an impeller within a hopper.

FIG. 14B illustrates a side discharge configuration of the exit slot 1430. The slot 1430 is located on the rear portion 1434 of the floor 1428. The location of the slot 1430 provides more compression of the powder 122 by the impeller 114, and prevents the powder 114 from leaking out of the slot 1430, and also deposits the powder 122 at a location on the print area 124 closer to the spreading rod 118 as compared to a central or front portion 1436 location of the slot 1430. It should be appreciated that the slot 1430 may also be located on the front portion 1436 of the floor 1428 in various embodiments.

Figure 14C:
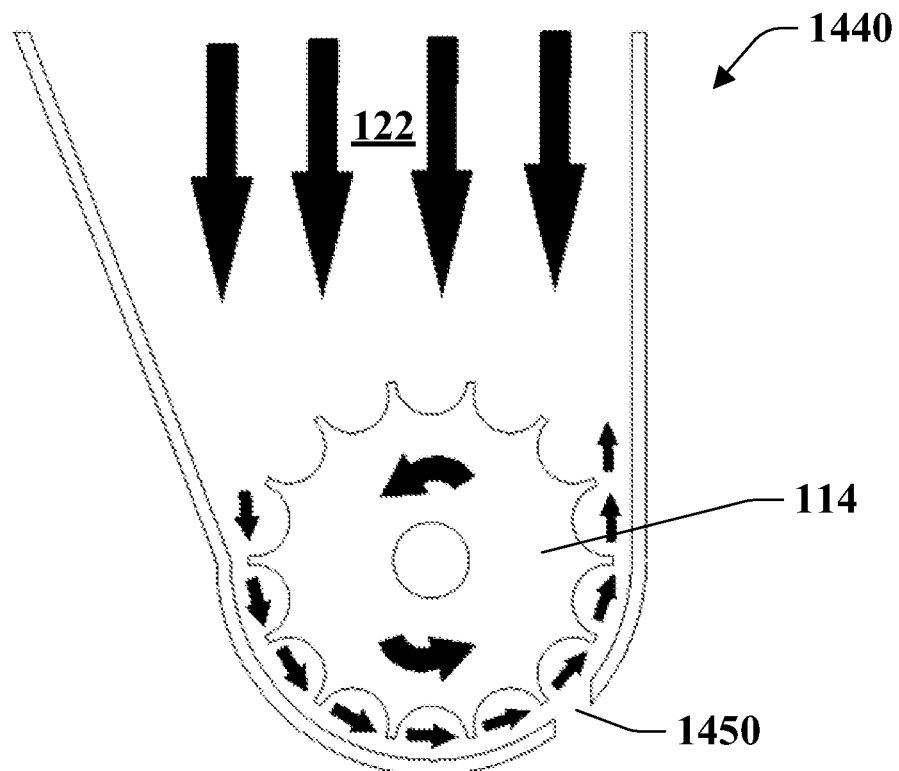
FIG. 14C is a side cross-section view of another exemplary arrangement of an impeller within a hopper.

FIG. 14C illustrates an embodiment of a hopper 1440, where a powder 122 packs into the teeth of the impeller 114 and rotates as a mass, with minimal powder output from the slot 1450. Such a result may be due to the type of powder used, for example.

Figure 15:
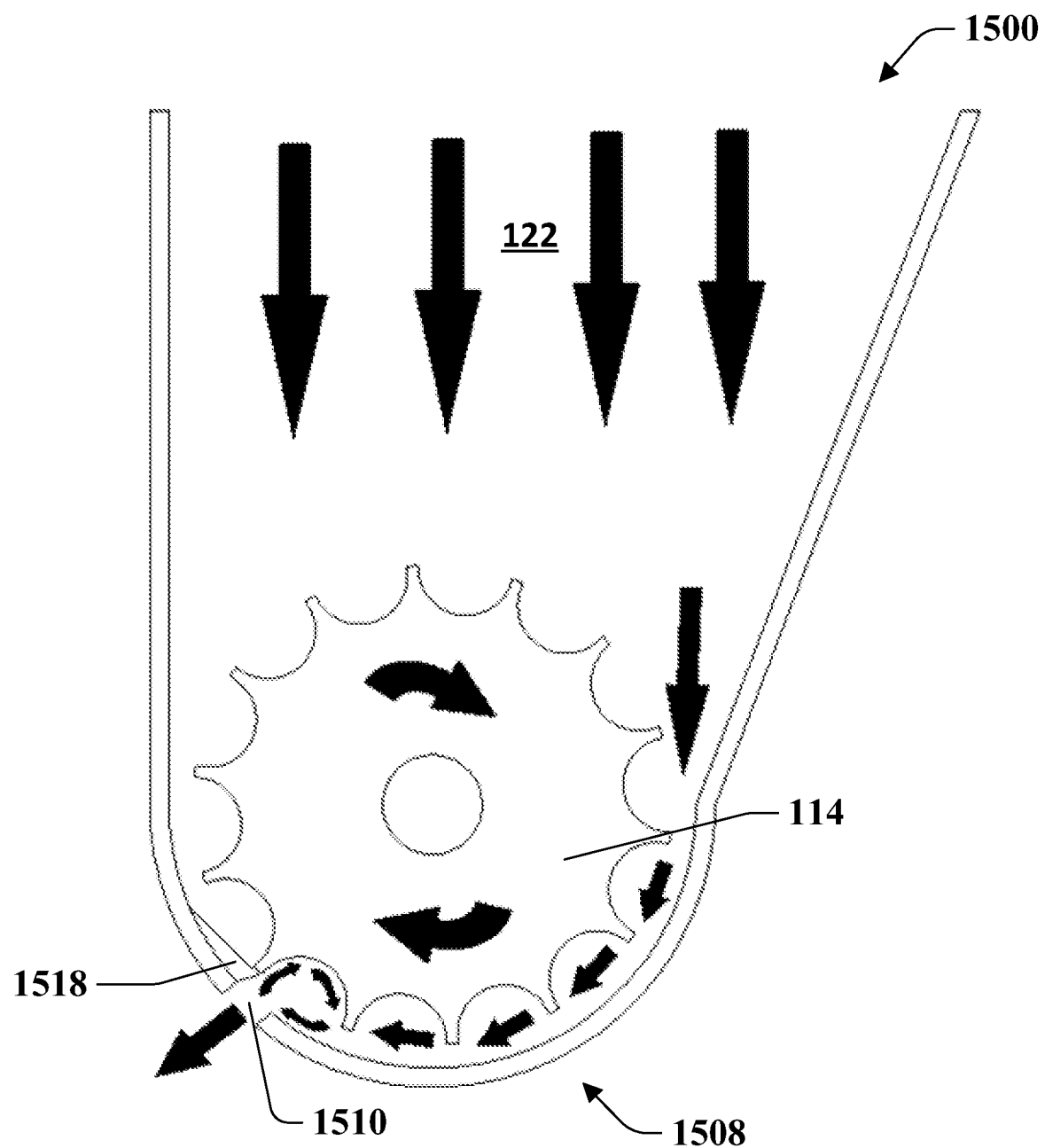
FIG. 15 is a side cross-section view of an exemplary arrangement of an impeller within a hopper.

Turning now to FIG. 15, hopper 1500 includes a floor 1508 having a slot 1510 that includes a tooth 1518 extending inwards towards the impeller 114. For powders that compact, but are not too cohesive, the addition of a tooth 1518 projection above the slot 1510 provides a force in the opposite direction of motion, and can help to encourage the pre-compressed powder 122 to release from the impeller 114 flutes so that they may discharge through the slot 1510 as intended. Close proximity of the tooth 1518 to the impeller 114 can cause a particle back pressure, releasing the powder 122 in the flutes of the impeller 114, thus reducing the amount of powder 122 that is carried full circle by the impeller 114. The functionality of the tooth 1518 is dependent on the gap between a tip of the tooth 1518 and the tip of the impeller 114, referred to as a tooth-to-tip gap. In certain embodiments, a tooth-to-tip gap of 6.5 mm, or approximately 60 times the mean powder diameter aids in dislodging the pre-compacted powder from the flutes of the impeller 114. In certain embodiments, smaller tooth-to-tip spacing can be more effective, and a gap of 0.65 mm, or 6 times the mean powder diameter, can be preferable. It is to be appreciated that the full range of tooth-to-tip gaps between 0.65 mm and 6.5 mm can be acceptable. Material wear due to abrasive powders is a concern for small tooth-to-tip and small tip to wall gaps, therefore abrasion resistant materials of construction, or abrasion resistant coatings can also be incorporated in certain embodiments.

Figure 16A:
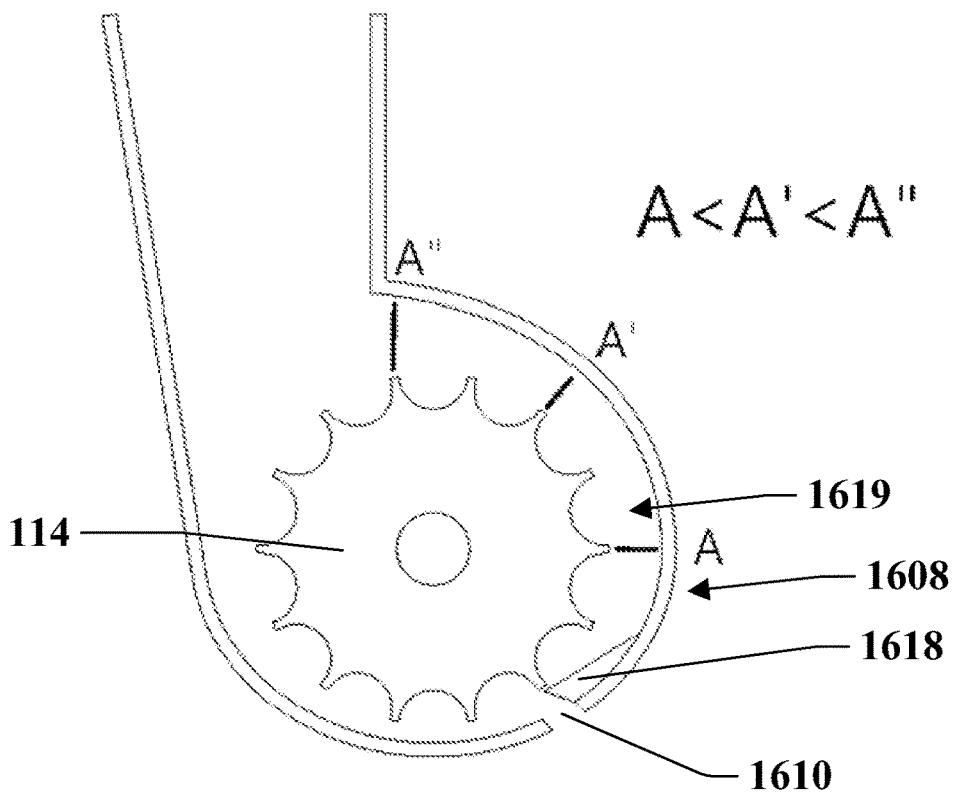
FIG. 16A is a side cross-section view of an exemplary arrangement of an impeller within a hopper.
Figure 16B:
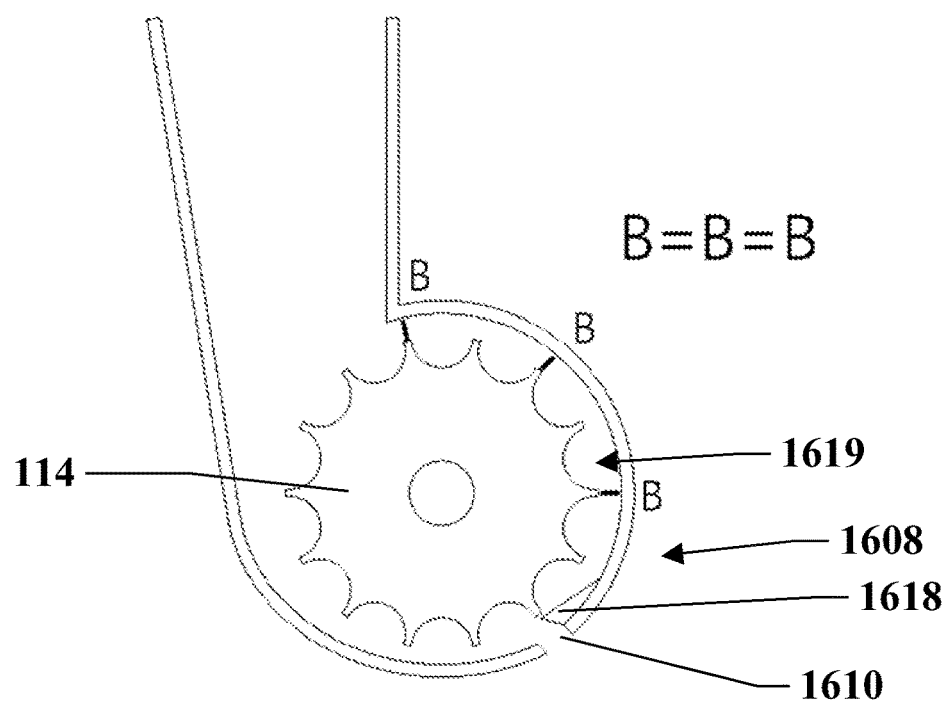
FIG. 16B is a side cross-section view of another exemplary arrangement of an impeller within a hopper.
Figure 17:
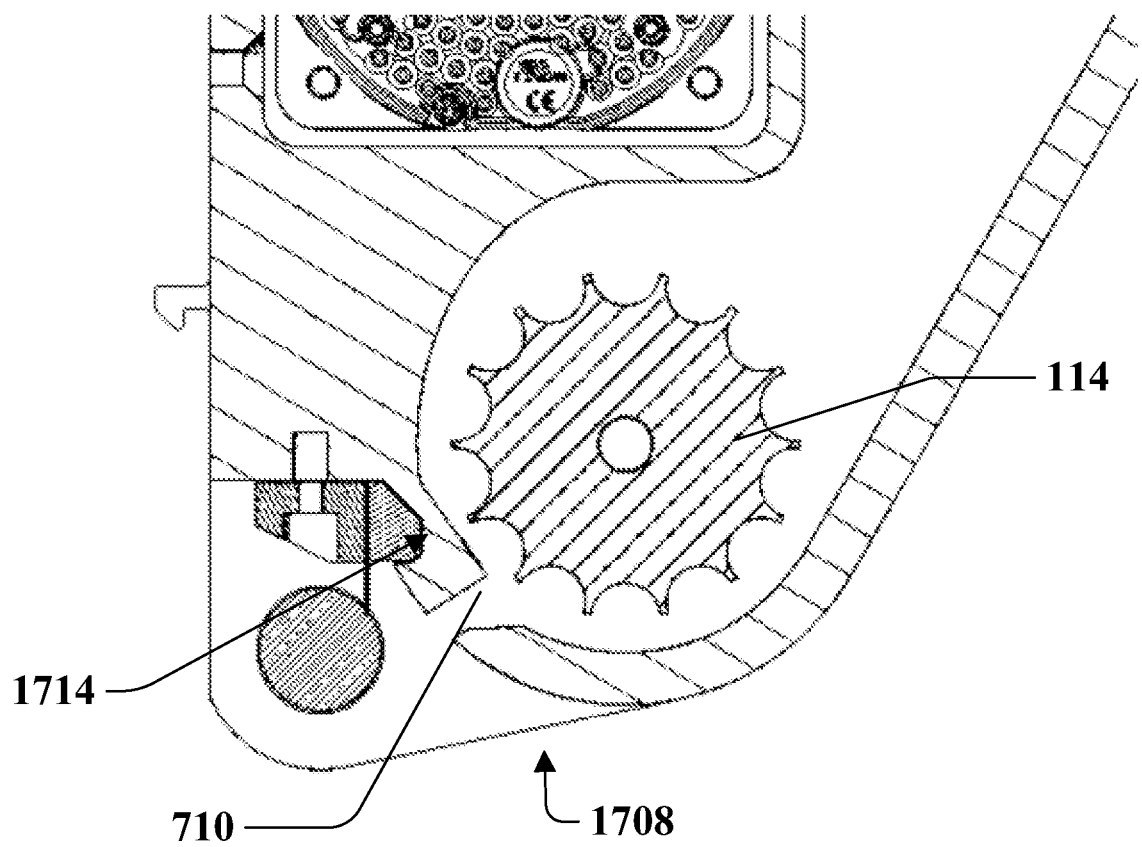
FIG. 17 is a side cross-section view of an exemplary arrangement of an impeller within a hopper.

Turning now to FIG. 16A, to further minimize the torque on the motor, the section of the impeller 114 housing defined by the floor 1608, just after the exit slot 1610 and tooth 1618 can be designed with a divergent cross section. The divergence allows any powder that remains attached to the impeller 114 to relax its state of compression, and therefore not exert substantial frictional or compressive forces on the wall of the floor 1408 during rotation. In other words, the flutes of the impeller 114 can be spaced from an interior wall of the floor 1608 by a gap distance A, and the gap distance A increases from the slot towards the rear wall along a length of the floor 1608. In combination with the overhang above the impeller 114, the ratio of the impeller 114 surface exposed to compressive load and shear forces resisting rotation can be reduced from nearly 100% of the perimeter, to as low as 50% of the perimeter, or even to as low as 25%. In certain embodiments, the divergent section 1619 can be a reverse Nautilus type shape, as seen in FIG. 16A, or a stepwise increase in the impeller 114 to wall gap B, as shown in FIG. 16B. FIG. 17 illustrates another example of the increasing gap distance between the tips of the impeller 114 flutes and the rear portion 1714 of the floor 1708 starting at the slot 1710.

In general, the gap between the tips of the fluted impeller 114 must be sufficiently close to the wall of the floor 1708 to resist powder 122 being blown through the gap between the impeller 114 and hopper walls. Similarly, the gap must be sufficiently close so that the clearance between impeller tip and wall causes powder to be pulled in, and through, the consolidation zone inside and around the impeller 114 flutes. In certain embodiments, impellers 114 are constructed of a single piece to eliminate any additional gaps between impeller components that could cause air gaps that leak powder 122, or cause variations in powder 122 flow. In certain embodiments, for powders 122 of size under 200 um, a gap of more than 4 mm between the impeller 114 flute and the wall of the floor 1708 surrounding the impeller 114 can fail to stop the powder from flowing around the impeller and through the exit slot 1710 when such flow is undesirable. With too large of a gap, the powder can compress during rotation and can pack into the flutes, and rotate as a solid mass with the impeller 114, effectively turning the impeller 114 into a rotating cylinder, instead of a series of small pockets of compressed powder. This condition can cause little to no powder to be pushed out the exit slot 1710. In certain embodiments, the impeller 114 to wall gap can be less than 4 mm, and even less than 2 mm. As a ratio of impeller-to-wall gap to powder 122 mean diameter, in certain embodiments, there can be a gap that is less than 40 times the mean diameter of the powder 122, including even less than 20×the mean diameter.

Figure 18:
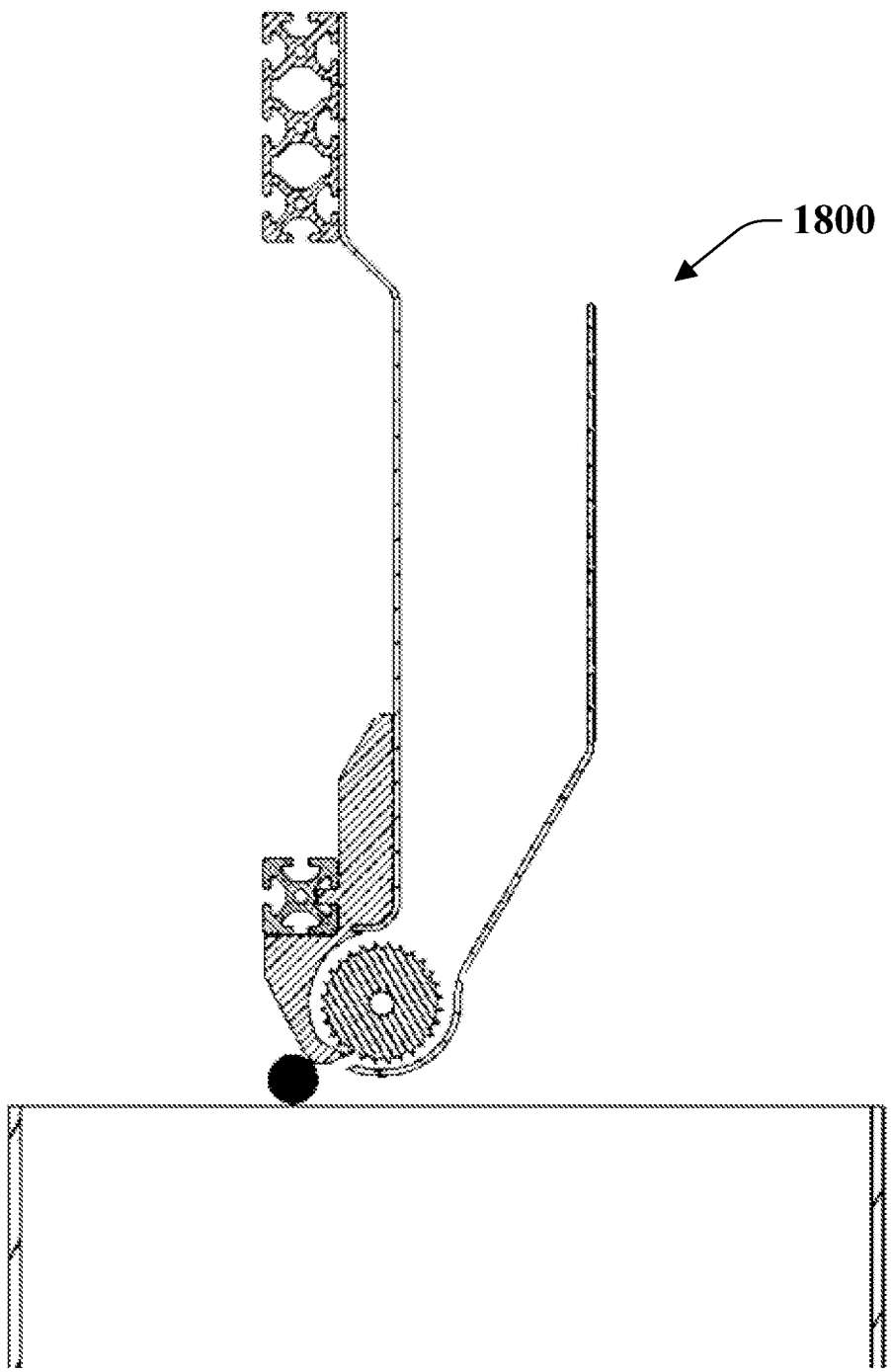
FIG. 18 is a side cross-section view of an exemplary arrangement of an impeller within a hopper.

Turning now to FIG. 18, a further embodiment of a hopper 1800 is depicted. Hopper 1800 can be constructed from bent sheet metal. In other embodiments, a hopper 102 can be constructed using other methods such as 3D printing or molding techniques.

Figure 19:
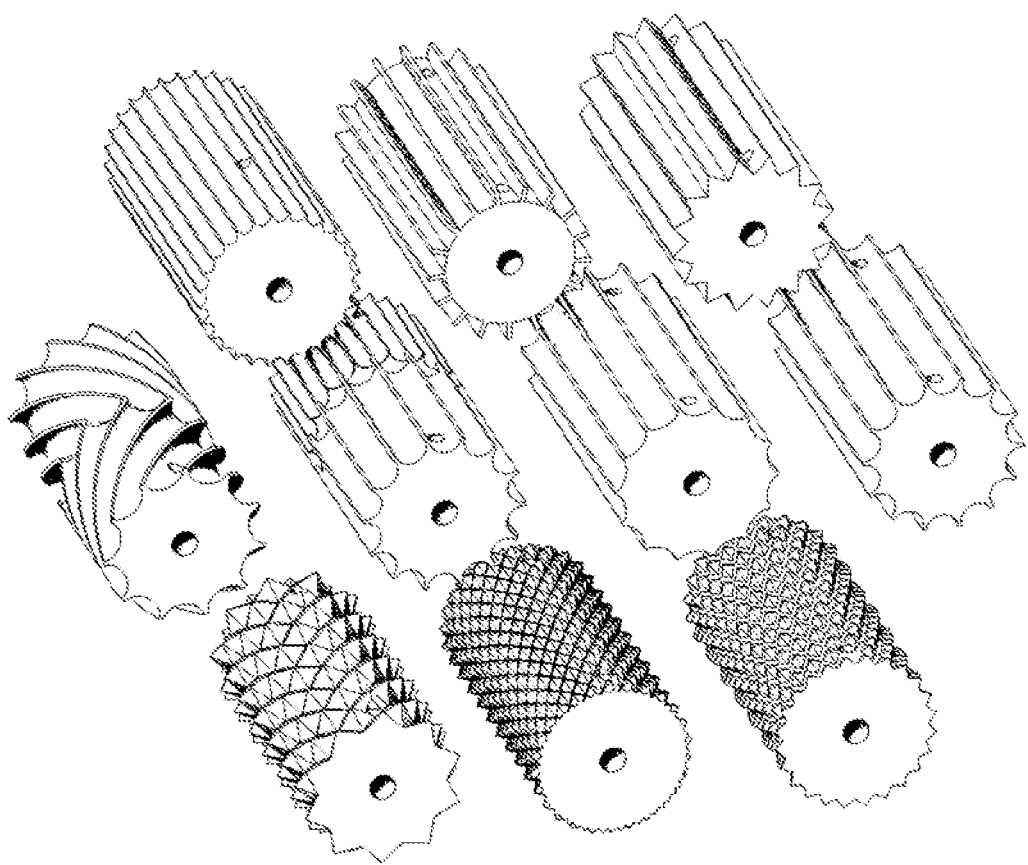
FIG. 19 is a perspective view of various embodiments of impellers.

Turning now to FIG. 19, different embodiments of impellers 114 are shown. Impeller 114 can include different layouts, numbers, and arrangements of flutes. In other embodiments, impeller 114 can include a knurled or diamond-like texture on the impeller 114.

Figure 20:
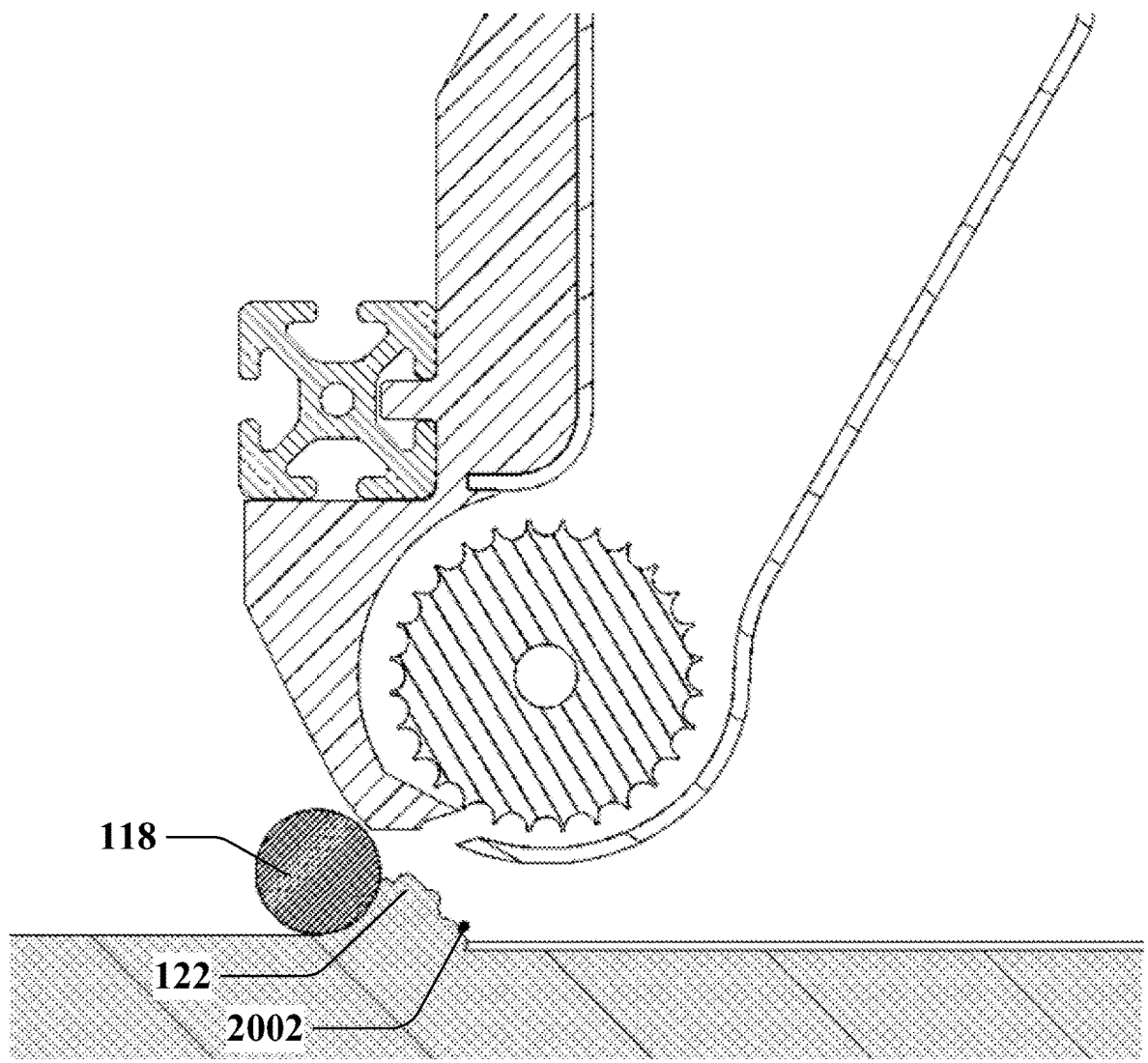
FIG. 20 is a side cross-section view of an exemplary arrangement of an impeller within a hopper, and a powder sensor.

FIG. 20 depicts a laser 2002 and sensor component that can sense and detect the presence of powder 122 on the layer of powder 122 being spread. The powder spreading apparatus 100 can be made self-adapting by the use of the laser 2002 and corresponding sensor to monitor the volume of powder 122 in front of the spreader rod 118, allowing the controller 200 to self-tune the speed of the impeller 114, spreader rod 118, and/or gantry 208 to keep a predetermined amount of powder 122 in front of the spreader rod 118. In other embodiments, load cells could monitor the average mass flow of powder from the hopper to make similar adjustments. The laser 2002 and optical sensor and/or the load cells can provide feedback to the controller 200 should excess powder 122 be dispensed. The controller 200 can then adaptively reduce the rate at which the impeller 114 turns, to reduce the amount of powder 122, and prevent wasted overflow.

In certain embodiments, the powder spreading apparatus 100 can include a second compression unit that is located immediately behind the spreader rod 118 and contacts the powder 122 immediately after the spreader rod 118 to provide further densification of the powder 122 layer in the build box 126. The second compression unit can be, for example, an additional smoothing roller physically offset by a distance behind the spreader rod 118, a static pressing plate with or without an angled surface, or a vibrating shoe, wherein the amplitude of the vibration is sufficient to provide the target compaction, and the frequency of vibration is sufficiently high in relation to the gantry 208 speed in order to avoid a wave-like deformation of the surface.

Figure 21:
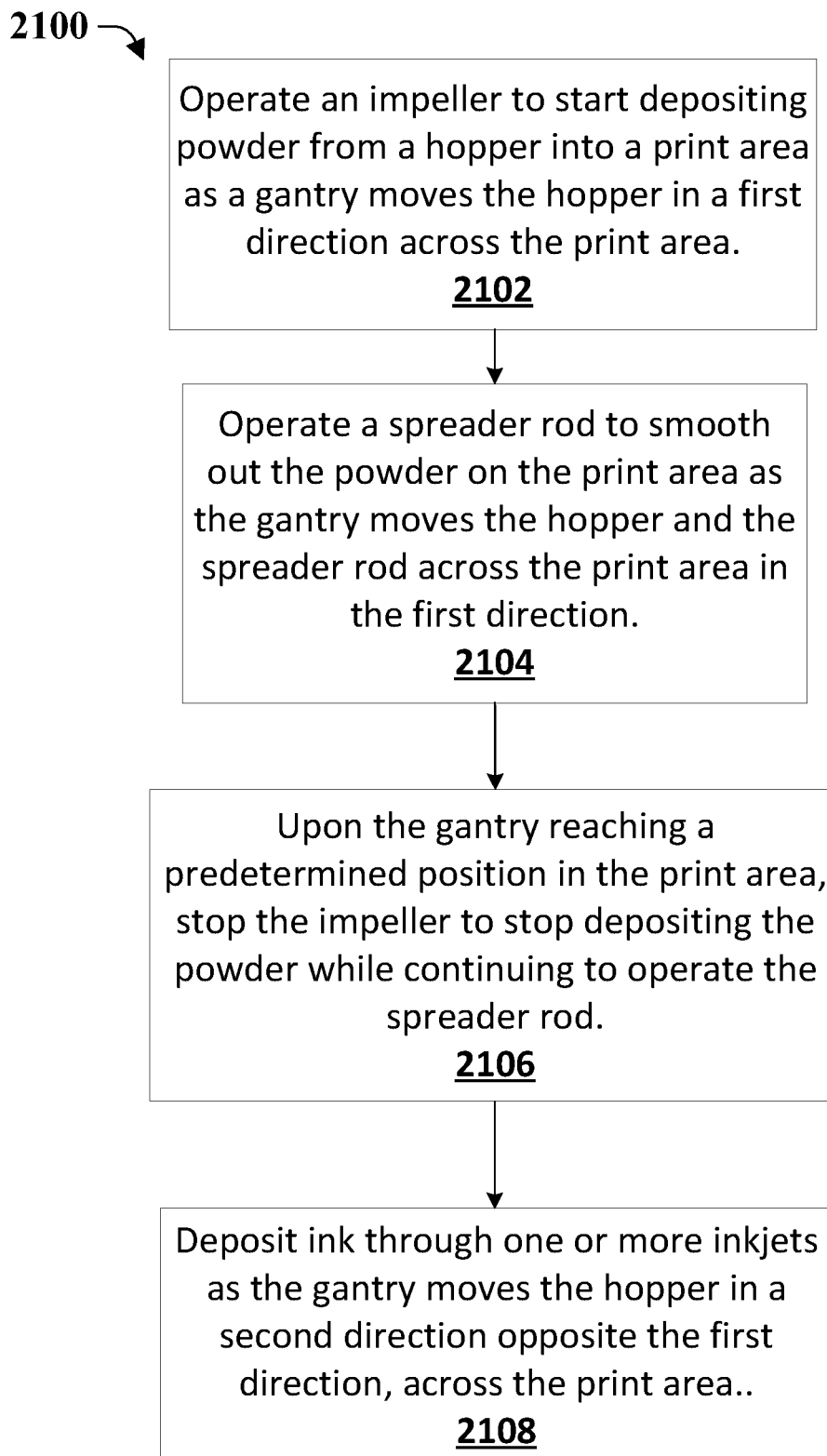
FIG. 21 is a flow chart depicting a method of depositing powder.

Turning now to FIG. 21, an exemplary method 2100 is depicted. At reference numeral 2102, an impeller 114 is operated to start depositing powder 122 from a hopper 102 into a print area 124 as a gantry 208 moves the hopper 102 in a first direction across the print area 124. At reference numeral 2104, a spreader rod 118 is operated to smooth out the powder 122 on the print area 124 as the gantry 208 moves the hopper 102 and the spreader rod 118 across the print area 124 in the first direction. At reference numeral 2106, upon the gantry 208 reaching a predetermined position in the print area, the impeller 114 is stopped to stop deposition of the powder 122 while continuing to operate the spreader rod 118. At reference numeral 2108, ink is deposited through one or more inkjets as the gantry 208 moves the hopper 102 in a second direction opposite the first direction, across the print area 124.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A powder spreading apparatus, comprising:
a hopper having a first end, a second end opposite from the first end, a front wall, a rear wall opposite from the front wall, and a floor, wherein the front wall, the rear wall, the first end, the second end, and the floor define an interior;
an impeller disposed within the interior of the hopper, wherein the impeller comprises a plurality of circumferentially spaced flutes and is configured to rotate about an impeller axis that extends from the first end of the hopper to the second end of the hopper and wherein the floor of the hopper includes a slot located below the impeller axis and the slot includes a tooth extending into the interior of the hopper towards the impeller; and
a spreader rod coupled to the hopper and extending along a spreader rod axis parallel to the impeller axis, wherein the spreader rod is configured to rotate about the spreader rod axis.

2. A powder spreading apparatus, comprising:
a hopper having a first end, a second end opposite from the first end, a front wall, a rear wall opposite from the front wall, and a floor, wherein the front wall, the rear wall, the first end, the second end, and the floor define an interior;
an impeller disposed within the interior of the hopper, wherein the impeller comprises a plurality of circumferentially spaced flutes and is configured to rotate about an impeller axis that extends from the first end of the hopper to the second end of the hopper and the floor of the hopper includes a slot located below the impeller axis and the slot includes a tooth extending into the interior of the hopper towards the impeller and a tip of the tooth is spaced apart from the plurality of flutes by a distance of between 0.65 millimeters and 6.5 millimeters; and a spreader rod coupled to the hopper and extending along a spreader rod axis parallel to the impeller axis, wherein the spreader rod is configured to rotate about the spreader rod axis.

3. A powder spreading apparatus, comprising:
a hopper having a first end, a second end opposite from the first end, a front wall, a rear wall opposite from the front wall, and a floor, wherein the front wall, the rear wall, the first end, the second end, and the floor define an interior;
an impeller disposed within the interior of the hopper, wherein the impeller comprises a plurality of circumferentially spaced flutes and is configured to rotate about an impeller axis that extends from the first end of the hopper to the second end of the hopper,
and the floor includes a slot below the impeller axis and the plurality of flutes are spaced from an interior wall of the floor by a gap distance, and the gap distance increases from the slot towards the rear wall along a length of the floor; and
a spreader rod coupled to the hopper and extending along a spreader rod axis parallel to the impeller axis, wherein the spreader rod is configured to rotate about the spreader rod axis.

* * * * *